United States Patent [19]

Gueldenpfennig et al.

[11] 3,748,390

[45] July 24, 1973

[54] PATH FINDING SYSTEM FOR LARGE SWITCHING NETWORKS

[75] Inventors: Klaus Gueldenpfennig, Penfield; Stanley L. Russell, Webster, both of N.Y.

[73] Assignee: Stromberg-Carlson Corporation, Rochester, N.Y.

[22] Filed: May 20, 1971

[21] Appl. No.: 145,292

Related U.S. Application Data

[63] Continuation-in-part of Ser. No. 92,593, Nov. 25, 1970.

[52] U.S. Cl. .......... 179/18 GE

[51] Int. Cl. .......... H04q 3/495

[58] Field of Search .......... 179/18 E, 18 EA, 179/18 GE, 18 FF, 22, 18 GF

[56] References Cited

UNITED STATES PATENTS

| | | | |
|---|---|---|---|
| 3,485,956 | 12/1969 | Jorgensen et al. | 179/18 GE |
| 3,626,111 | 12/1971 | Duval et al. | 179/18 GF |

*Primary Examiner*—Thomas W. Brown

*Attorney*—Charles C. Krawczyk

[57] ABSTRACT

A path finding system for effecting selection and interconnection of electrical circuits through a network of switching matrices interconnected by links to provide plural paths between opposite ends of the network. The network includes at least five stages. The stages at opposite ends of the network are interconnected to function as a plurality of individual two stage networks to provide a path between any circuits connected to opposite ends of the two stage network. Two of the circuits on opposite ends of the network are marked for connection. The busy-free status of the matrix link interconnections to the middle stage or stages defining the available paths between two marked circuits are sequentially scanned by a plurality of link check circuits. When a combination of free links defining a free path has been detected, the scanning is stopped and the connection through the network is completed via the free links.

28 Claims, 14 Drawing Figures

KLAUS GUELDENPFENNIG
STANLEY L. RUSSELL
*INVENTORS*

BY [signature]

ATTORNEY

KLAUS GUELDENPFENNIG
STANLEY L. RUSSELL
INVENTORS

BY [signature]

ATTORNEY

KLAUS GUELDENPFENNIG
STANLEY L. RUSSELL
*INVENTORS*

BY [signature]

ATTORNEY

KLAUS GUELDENPFENNIG
STANLEY L. RUSSELL
INVENTORS

BY Charles C. Krawczyk

ATTORNEY

KLAUS GUELDENPFENNIG
STANLEY L. RUSSELL
INVENTORS

BY Charles C. Krawczyk
ATTORNEY

KLAUS GUELDENPFENNIG
STANLEY L. RUSSELL
INVENTORS

BY Charles C. Krawczyk

ATTORNEY

KLAUS GUELDENPFENNIG
STANLEY L. RUSSELL
*INVENTORS*

BY Charles C Krawczyk

ATTORNEY

KLAUSS GUELDENPFENNIG
STANLEY L. RUSSELL
*INVENTORS*

BY [signature]

*ATTORNEY*

KLAUS GUELDENPFENNIG
STANLEY L. RUSSELL
INVENTORS

BY Charles C. Krawczyk

ATTORNEY

KLAUS GUELDENPFENNIG
STANLEY L. RUSSELL
INVENTORS

BY [signature]
ATTORNEY

KLAUS GUELDENPFENNIG
STANLEY L. RUSSELL
INVENTORS

BY [signature]

ATTORNEY

KLAUS GUELDENPFENNIG
STANLEY L. RUSSELL
INVENTORS

BY Charles C. Krawczyk

ATTORNEY

KLAUS GUELDENPFENNIG
STANLEY L. RUSSELL
INVENTORS

BY Charles C. Krawczyk

ATTORNEY

PATH FINDING SYSTEM FOR LARGE SWITCHING NETWORKS

This application is a continuation-in-part application filed on a copending patent application, Ser. No. 92,593, filed on Nov. 25, 1970, entitled, "Path Finding System" and assigned to the assignee of the present application.

BACKGROUND OF THE INVENTION

This invention pertains to matrix systems in general, and more particularly, to path finding systems for multistage matrix networks.

Matrix networks, in general, are used to provide switched interconnections between a large number of circuits that are connected to opposite ends of the network. In the case of data communication systems and telephone systems, the switching network provides a plurality of paths through the network for interconnecting any pair of circuits at opposite ends of the network via any one of the plurality of available paths. Furthermore, the switching networks in telephone systems provide a concentrating and/or a fan-out function to allow interconnection between a large number of telephones and a smaller number of interconnecting circuits, such as junctors, in the exchange. With a plurality of available paths for interconnecting circuits connected to opposite ends of the network, a path finding system is necessary to locate one path through the network that is free, and complete the connections through the network and also assure that only one path is used for each connection through the network.

One example of a path finding system of the prior art is disclosed in a U.S. Pat. No. 3,542,960, entitled "System for Selecting a Free Path Through a Multi-Stage Switching Matrix Having a Plurality of Paths Between Each Input and Output Thereof," filed on Oct. 12, 1967, for Gerhard O.K. Schneider wherein circuits at the opposite ends of the network are marked and a step-by-step scanning scheme is provided that sequentially steps through the network stages to select single free links from a multiplicity of available links between the plurality of matrix stages, identifies a free path, and then completes the free path. Examples of a path finding system are disclosed in the U.S. Pat. No. 3,585,309, entitled "Crosspoint Network Path Finding System," and filed on Dec. 9, 1968, for Klaus Gueldenpfennig and a U.S. Pat. No. 3,637,944 entitled "Path-Finding System For Relay-Type Cross-Point Matrix Networks", filed on Nov. 25, 1970. In these two copending applications circuits on opposite ends of the network are marked and the busy-free status of the multiplicity of available links between two matrix stages are monitored to select a single free link corresponding to a portion of one of the paths through the network. Guard relays are provided in the multiplicity of available links between other matrix stages to inhibit the path finding scheme from attempting to complete a path through busy links.

The path finding systems of the U.S. Pat. Nos. 3,585,309, and 3,637,944, 3,542,960, disclose systems for providing connections through switching networks that have wide use in telephone systems and the like, however, the path finding systems have a timing limitation that inhibits their use in some areas, such as for example, when connections are required to be made through networks in extremely short time intervals. For example, there are times when connections are required to be established through a network wherein the interdigit dialing time, such as in the case of direct inward dialing (DID). The exchange must be capable of recognizing a direct inward dial call and connect the DID trunk to a register via the network between the time a first dial signal is received and the occurrence of the second dial signal. In addition to the foregoing, the exchange should be capable of completing several connections through the network within the interdigit dialing time to assure that calls will not be lost in the event several DID calls are received within the interdigit dialing time. If a register is not connected to the DID trunk during the interdigit time, the call is lost.

In the path finding system of the U.S. Pat. No. 3,542,960, the step-by-step procedure requires several series of scans, each of which establishes a portion of the path through the network. The time required for the several scans limits the use of such path finding systems to more conventional systems that do not require several connections within interdigit dialing signals. The path finding system of the U.S. Pat. Nos. 3,585,309, and 3,637,944 can, under favorable circumstances, provide several connections through the network within the interdigital dial signals. This is accomplished when a free link for a portion of a path has been detected which is interconnected through the other matrix stages to corresponding links that are also free. If the corresponding link is busy, the path finding scheme will have to be recycled. Any such recycling is time consuming and may at times be repeated, perhaps several times. Hence, the possibility of requiring several path finding cycles to assure a final connection, limits the use of such a path finding system to the more conventional systems that do not require that several connections are completed with interdigital dial time.

It is therefore an object of this invention to provide a new and improved path finding system for effecting interconnection of circuits through a network of switching matrices.

It is also an object of this invention to provide a new and improved path finding system for effecting interconnection of circuits through a multistage network of switching matrices that locates an available free path through a matrix network in a single scan cycle.

It is a still further object of this invention to provide a new and improved path finding system for effecting interconnection of circuits through a network of switching matrices that simultaneously monitors the busy-free status of link interconnections between several stages in the network to detect an available free path through the netowrk in a single scan cycle.

It is also an object of this invention to provide a new and improved path finding system for effecting interconnection of circuits through a network of switching matrices in substantially less then telephone interdigital dial signal periods.

It is also an object of this invention to provide a new and improved path finding system for effecting a plurality of interconnections of circuits through a network of switching matrices within telephone interdigital dial signal periods.

It is also an object of this invention to provide a new and improved path finding system for effecting interconnection of circuits through a network of switching matrices that is particularly adaptable to telephone systems for connecting direct inward dialing trunks and registers.

It is also an object of this invention to provide a new and improved path finding system for effecting interconnection of circuits through a network of switching matrices including five stages and wherein two of the stages at opposite ends of the network are interconnected to function as a plurality of individual two stage matrices.

BRIEF DESCRIPTION OF THE INVENTION

A path finding system for interconnection of circuits through a switching network, wherein the network includes at least five matrix stages interconnected to provide plural paths between circuits connected to opposite ends of the network and wherein each stage is divided into separate matrix groups. The matrix groups in two of the stages at opposite ends of the network are interconnected to function as a plurality of individual two stage networks to provide a path between any circuits connected to opposite ends of the two stage network. The circuits at opposite ends of the entire network to be connected are marked. The busy-free condition of the individual link interconnections between the middle stage or stages of the network and the two stage network at the ends of the entire network including paths for interconnecting the marked circuits are sequentially scanned. Circuit means, responsive to the simultaneous detection of a free condition in corresponding link interconnections that define a free path through a network, completes the connection through the free path and connects the marked circuits.

In a first embodiment of the invention, circuit means are included in the matrix groups in at least the two groups in the two stage network of tne entire network for providing signals designating the busy-free condition of the individual link interconnections to the stages. The busy-free signals of link interconnections to selected two stage networks are sequentially and simultaneously scanned for detecting the free path.

In a second embodiment of the invention, the matrix groups comprise relays having control and hold coils and the busy-free condition of the individual link interconnections to a selected two stage network is detected by presence and/or absence of a potential applied to the hold coils.

In accordance with a third embodiment of the invention the network includes at least six stages wherein the matrix groups of the middle stages are also interconnected to function as a plurality of individual two stage networks to provide a path between any of the link interconnections connected to opposite ends of the middle stages.

DESCRIPTION OF THE PREFERRED EMBODIMENT

Figure 1:
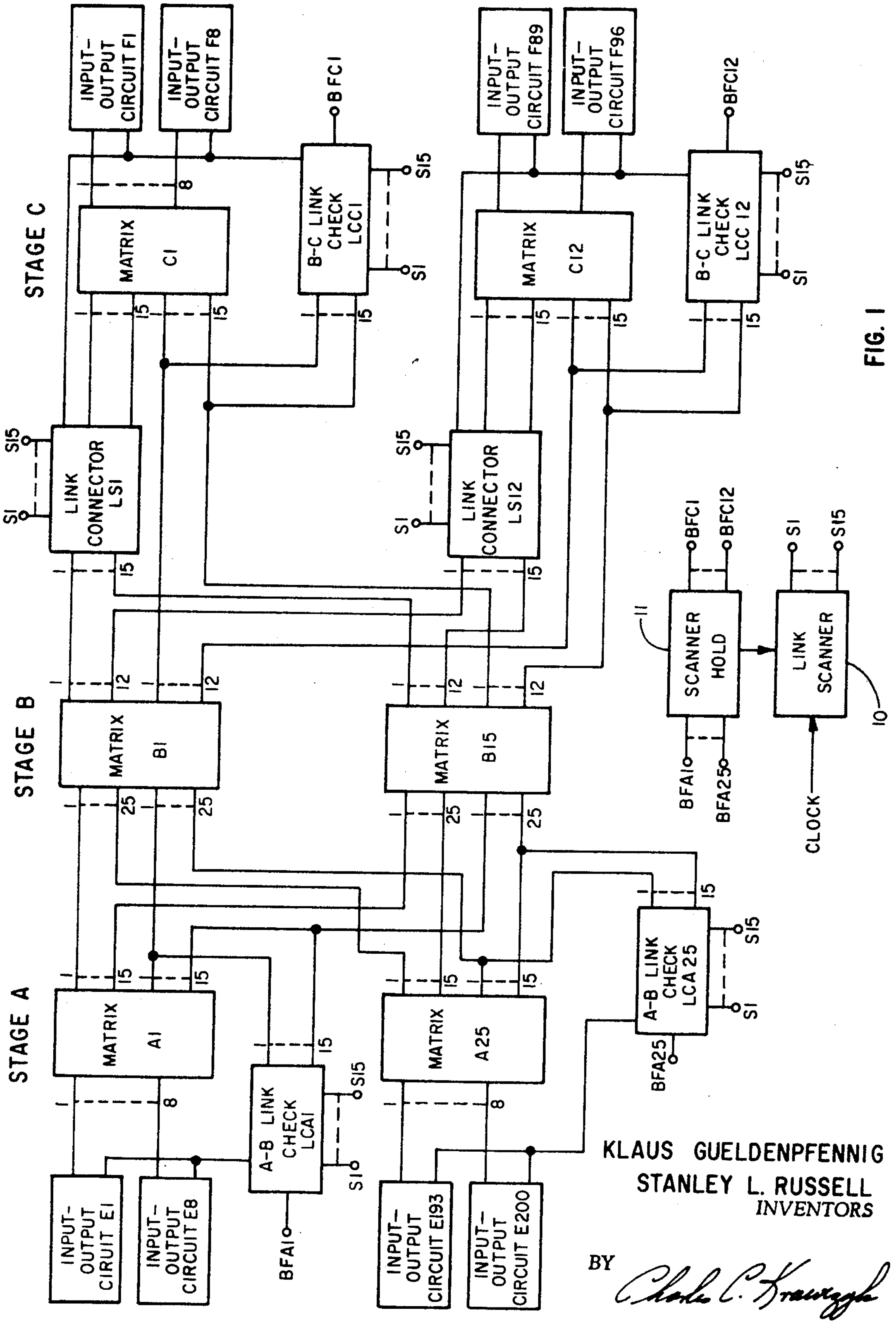
FIG. 1 is a simplified block diagram of a switching network including the path finding system of the invention.

The path finding system of the invention is described in FIG. 1 in connection with a three stage (A, B and C) full availability switching matrix network. Each stage includes a plurality of matrix groups which are interconnected so as to provide, in the network depicted herein for purposes of illustration, 15 possible connections between any of the input-output circuits at one end of the network and any of the input-output circuits at the other end of the network. For purposes of illustration, two hundred input output circuits (E1 through E200) are connected to the stage A and ninety-six input-output circuits (F1 through F96) are connected to the stage C. The stage A includes 25 matrix groups (A1 through A25) with eight separate input-output circuits connected to each matrix group. The stage B includes 15 matrix groups (B1 through B15). The stage C includes 12 matrix groups (C1 through C12) with eight input-output circuits connected to each matrix group.

The matrix groups in stages A, B and C are interconnected by signal links or link interconnections (illustrated as the upper group of lines extending into and from the various matrix groups) in an arrangement wherein any one of the input-output circuits connected to the stage A (E1 through E200) can be interconnected via the network by any one of 15 paths to any of the input-output circuits (F1 through F96) connected to the stage C. For further information on the interconnections of matrices in the manner described above is available in an article entitled "A Study of Non-Blocking Switching Networks" by C. Clos, which appeared in the "Bell System Technical Jounal," Volume 32, March 1953, pages 406–424.

Figure 2:
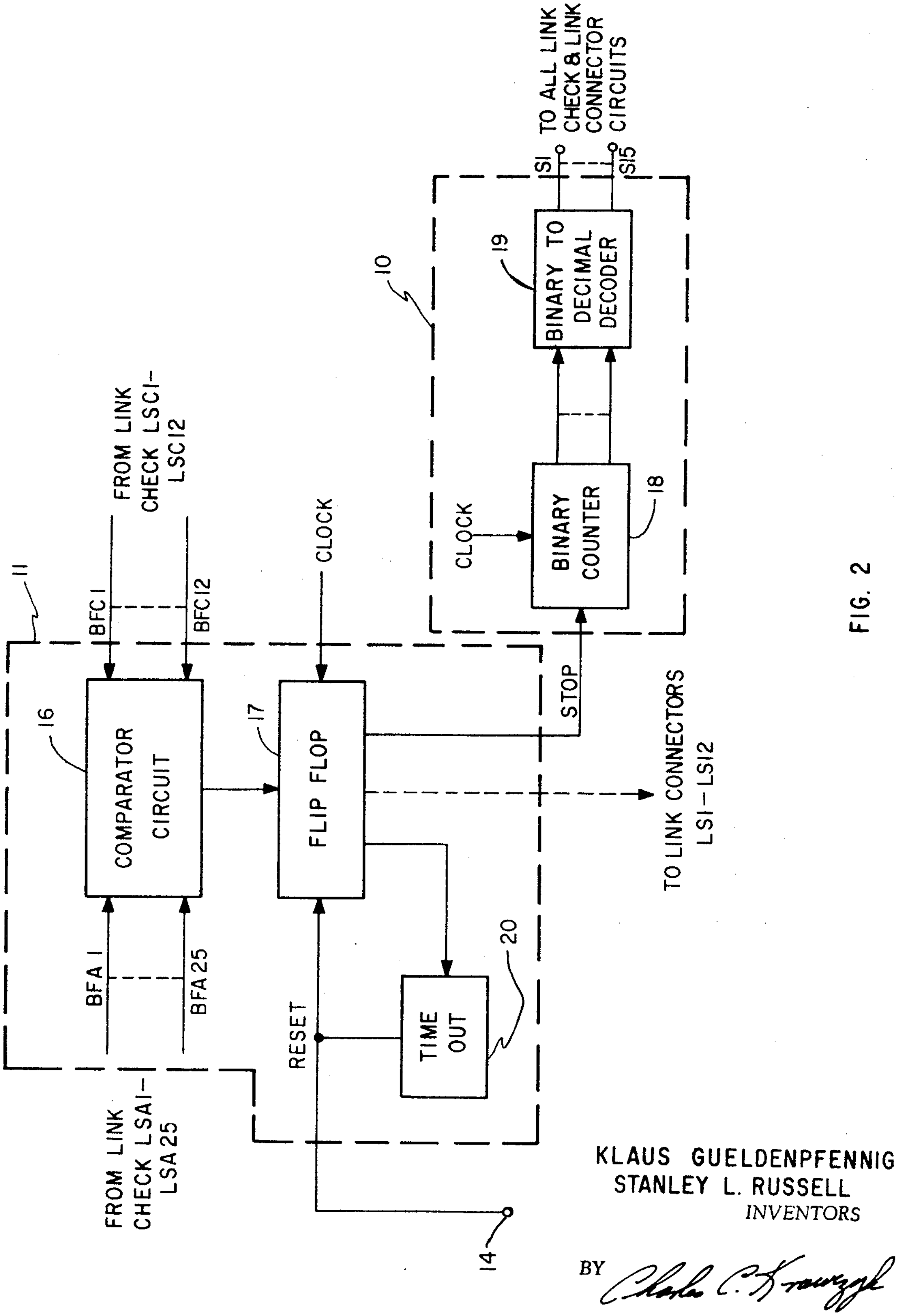
FIG. 2 is an expanded block diagram of the link scanner and scanner hold circuits of FIG. 1.

If the switching network is to form a part of a telephone switching system, the input-output circuits E1 through E200 can correspond to line circuits, or service circuits, while the input-output circuits F1 through F96 can correspond to junctor or trunk circuits. Further, it should be understood that the three stage matrix illustrated in FIG. 2 is merely exemplary and that other arrangements of switching matrices having a different number of matrix groups in each stage and having a greater number of matrix stages can also be used with the path finding system of the invention.

In accordance with the path finding system of the invention, a plurality of link connector circuits (LS1 through LS12) are connected in series with the link interconnections between the stage B and stage C matrix groups. A separate link connector circuit is provided for each of the stage C matrix groups C1 through C12. The link connectors include a separate switch means in series with individual ones of the link interconnections. The separate switch means, when actuated, function to complete a connection through the network. A second group of link interconnections (designated as link check interconnections) are made between the stage A and stage B matrix groups, and also between the stage B and stage C matrix groups, for link check purposes. The link check interconnections are illustrated as the lower group of connections to each of the matrix groups, and are interconnected between the various matrix groups and stages in the same manner as the signal link interconnections. The link check interconnections provide a signal indicating the busy-free status of the corresponding link interconnection. A separate link check circuit (LCA1 through LCA25) is provided for each of the matrix groups A1 through A25. The link check circuits LCA1 through LCA25 are coupled to the link check interconnections to monitor the busy-free status of the 15 link interconnections to stage A matrix groups A1 through A25. In addition, a separate link check circuit (LCC1 through LCC12) is provided for each of the stage C matrix groups (C1 through C12). The link check circuits LCC1 through LCC12 are coupled to the link check interconnections to monitor the busy-free status of the 15 link interconnections to the stage C matrix groups C1 through C12.

Each of the link check circuits are connected to be enabled by the input-output circuits connected to corresponding matrix groups. For example, the link check circuit LCA1 is enabled by a request for service from any of the input-output circuits E1 through E8 connected to the matrix groups A1. Likewise, the link check circuit LCC1 is enabled by a request for service from any of the input-output circuits F1 through F8 connected to the matrix group C1. In addition, the link connectors LS1 through LS12 are also connected to be enabled by the input-output circuits connected to corresponding stage C matrix groups. For example, when the link check circuit LCC1 is enabled, the link connector LS1 will also be enabled. Hence, as can be seen that when the input-output circuits on opposite ends of the network are marked for connection, the corresponding link check circuits and a link connector are automatically enabled.

The link check circuits LCA1 through LCA25, the link check circuits LCC1 through LCC12, and the link connector circuits LS1 through LS12 are connected to receive sequential scanning pulses from a common link scanner circuit 10 via terminals S1 through S15. With 15 link interconnections available for each of the matrix groups in the stages A and C, 15 sequentially timed pulses are applied to the terminals designated S1 through S15 for scanning through the selected groups of link check interconnections to determine the busy-free status of corresponding link interconnections. For example, if input-output E1 is to be connected to the input-output circuit F1, the link check circuits LCA1 and LCC1 and the link connector circuit LS1 are enabled. There are 15 possible connections between the input-output circuits A1 and C1, with each path going through a different stage B matrix group. When the link check and link connector circuits are enabled, the scanning pulses applied to the link check circuits allow the enabled link check circuits to sequentially monitor the busy-free condition of the link interconnections comprising each of the available 15 paths and to allow the link connector circuit to simultaneously select the link interconnection between the stages B and C as the corresponding link check interconnections are being monitored. The link connector circuits LS1 through LS12, when enabled, scan along in synchronism with the link check circuits to sequentially drive connector switches that are connected to complete the paths through the links between the selected matrix modules in stages B and C, however, the repetition rate of scanning pulses from the link scanner circuit 10 is sufficiently high that the connector switches do not respond to the scannin pulses.

The link check circuits LCA1 through LCA25, when enabled, scan the various link check interconnections and produce corresponding busy-free signals at the terminals BFA1 through BFA25, respectively. The link check circuits LCC1 through LCC12, when enabled, scan the various link check interconnections and produce corresponding busy-free signals at the terminals BFC1 through BFC12, respectively. The busy-free signals occur in synchronism between corresponding BF terminals due to the use of a common link scanner 10 for all the link check circuits. If a simultaneous free signal appears in corresponding A–B and B–C link interconnections, a free path through the network has been found. The busy-free terminals BFA1 through BFA25 and BFC1 through BFC12 are connected to a scanner hold circuit 11 that detects a simultaneous occurrence of a free signal from the A–B and B–C link check circuits. When a simultaneous free signal is present at these terminals, the scanner hold circuit 11 applies a stop signal to the link scanner circuit for a sufficient period of time to allow the corresponding switch means in the link connector circuit and the crosspoint devices in the network to pick up and complete the connections through the network.

An embodiment of the link scanner 10 and the scanner hold circuit 11 is illustrated in FIG. 2. The link scanner circuit 10 includes a binary-to-decimal decoder 19 receiving pulses from a clock driven binary counter 18 to develop the sequential scanning pulses at the terminals S1 through S15. It is to be understood, of course, that the link scanner circuit would include other means of providing the sequential scanning pulses, such as for example, by connecting a shift register as a ring counter. The scanner hold circuit 11 includes a comparator circuit 16 connected to receive the busy-free signals BFA1 through BFA25, and BFC1 through BFC12. When a simultaneous free signal is present at the BFA and BFC inputs to the comparator circuit 16, the comparator circuit applies a stop signal to set a flip-flop circuit 17 in synchronism to a clock pulse. A flip-flop circuit 17, when set, applies an inhibit signal to the binary counter 18 which stops the counter circuit and holds the output of the decoder 19 constant at a count corresponding to the free path. The link connector circuit is now enabled for a sufficient period of time to pick up the connector relay and crosspoint devices to complete the connection through the network. A reset pulse is applied to the flip-flop 17 via terminal 14 to reset the flip-flop after a sufficient period of time has elapsed for completing the connection through the network once a free path has been located. A time out circuit 20 is also coupled to the reset terminal of the flip-flop 17 as a safeguard in the event the system timing does not remove the hold scan signal.

If the link connectors LS1 through LS12 include semiconductor switch devices that can respond to the rapid scanning pulses, the flip-flop circuit 17 can also be connected to each of the link scanners (as designated in phantom in FIG. 2) so that the link connectors are inhibited from responding to the scanning pulses until a free path has been found. The selected link connector circuit will then only be enabled to complete the path after the flip-flop 17 is set.

Figure 3:
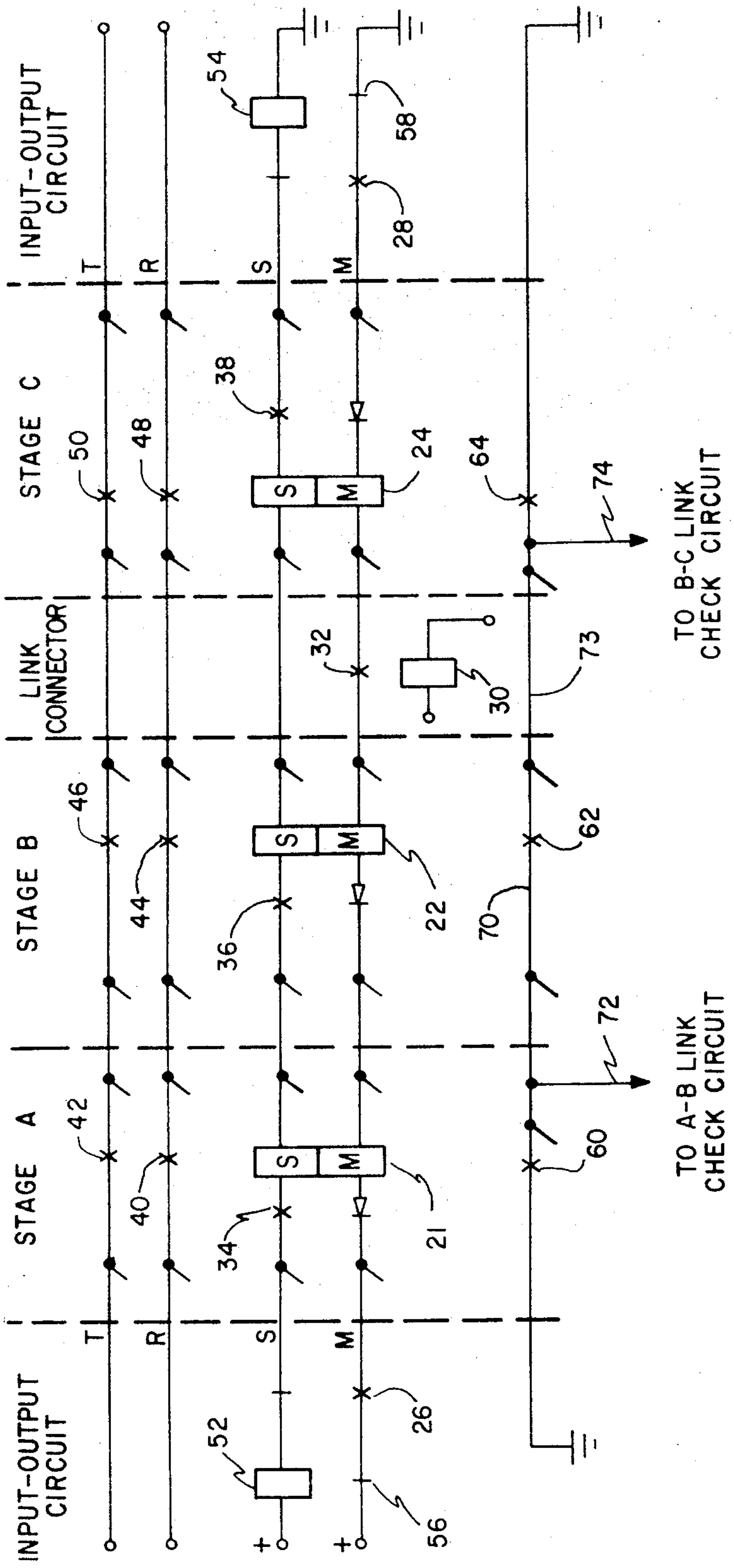
FIG. 3 is a schematic diagram illustrating the mark, sleeve, tip and ring circuits through one complete connection through the network of FIG. 1 and, in addition, includes circuit means for providing a signal designating the busy-free condition of the link interconnections through the network, and a link connector for completing the connections through the network in accordance with the invention.

FIG. 3 illustrates an embodiment of the mark, sleeve, tip and ring connections through a three stage relay switching matrix for use in telephone circuits and the like. For purposes of simplification, only one complete path through the network is illustrated. Each of the relays 21, 22 and 24 in the matrices in stages A, B and C include a mark or control coil M and a sleeve or a hold coil S. When a connection through the network is to be completed, mark contacts 26 and 28 in the input-output circuits on the opposite ends of the network are closed. Simultaneously, the corresponding two link check circuits and the corresponding link connector circuit are enabled to initiate the path finding procedure. The link connector circuit, for example, can include a separate relay 30 for each of the mark link interconnections between the stages B and C with contacts 32 of the connector relay 30 connected in series with the mark line. As previously mentioned, the line connector receives scanning pulses at a rapid repetition rate so that the path through the network cannot be completed while scanning. In the case of the connector relay 30, the scanning rate will be sufficiently fast so that the relay cannot respond to the scan signal. If a semiconductor switch is to be used instead of the relay 30, the semiconductor device will be inhibited from responding to the scan pulses (as previously described) until after a free path is located.

When a free path through the network is located including the relays 21, 22 and 24 of FIG. 3, the enabled link scanner is stolped for a sufficient period of time to energize the connector relay 30 and close the contacts 32. This completes the circuit for the mark relay coils and activates the relays 21, 22 and 24 closing contacts 34–50. The contacts 34, 36 and 38 complete the path through the sleeve coils of relays 21, 22 and 24 and through the cut off relay coils 52 and 54 in the input-output circuits. When the relays 52 and 54 are activated, their contacts 56 and 58, respectively, open to disconnect opposite ends of the mark circuit. The connection through the network is now maintained by the sleeve coils of relays 21, 22 and 24. The tip (T) and ring (R) interconnections between the input and output circuits are completed via the contacts 40–50.

According to the invention, each of the matrix relays 21, 22 and 24 have additional normally open contacts 60, 62 and 64 which function to provide an indication of the busy-free condition of the particular relay in the network. The contacts 60, 62 and 64, when closed, are connected in series to ground at opposite ends in the input-output circuits. The series circuit, including the contacts 60, 62 and 64 form a link check interconnection circuit corresponding to the path through the network including relays 21, 22 and 24. The link check interconnection 70 between the contacts 60 and 62 is connected via line 72 to its corresponding A-B link check circuit while the link check interconnection 73 between contacts 62 and 64 is connected via line 74 to its corresponding B-C link check circuit. If the path corresponding to relays 21, 22 and 24 is free, the contacts 60, 62 and 64 will be open and no ground will be present at either of the lines 72 and 74 and the link check circuits will designate a free path. On the other hand, if either the relay 21 or the relay 24 is activated, or both, the corresponding contacts 60 or 64, or both, will be closed and ground will be present at either line 72 or 74, or both, indicating a busy path. It is to be understood, of course, that other matrix relays are connected to the link interconnections 70 and 73, and if any such relay is actuated so as to connect one of the link interconnections 70 and 73 of FIG. 3 in a path, the corresponding link check interconnection 70 or 73 will be grounded.

Figure 4A:
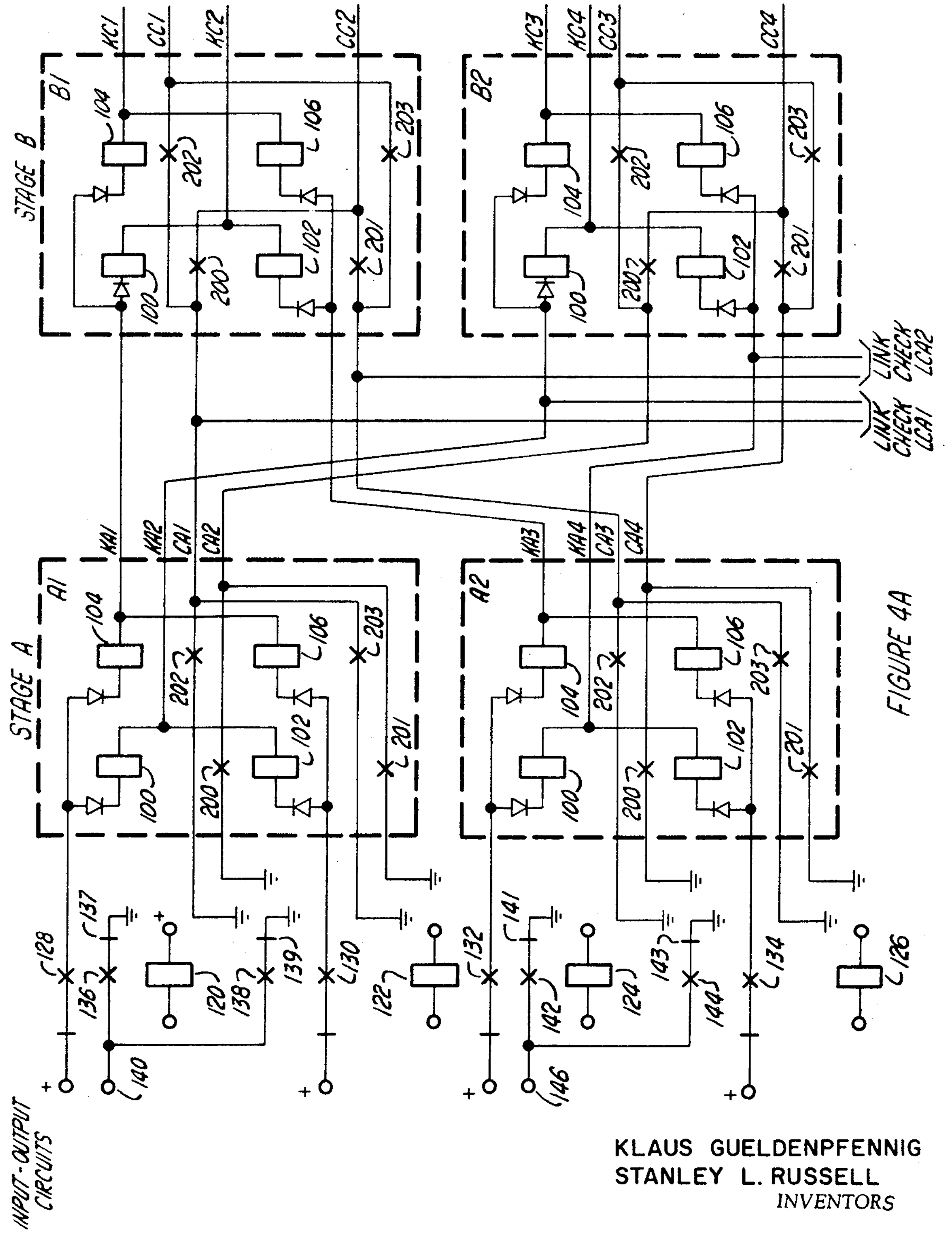
FIGS. 4A and 4B, in combination, include a schematic diagram of a simplified three stage switching network of FIG. 1 illustrating the circuit means for providing the busy-free condition of the various link interconnections throughout the network in accordance with the invention.
Figure 4B:
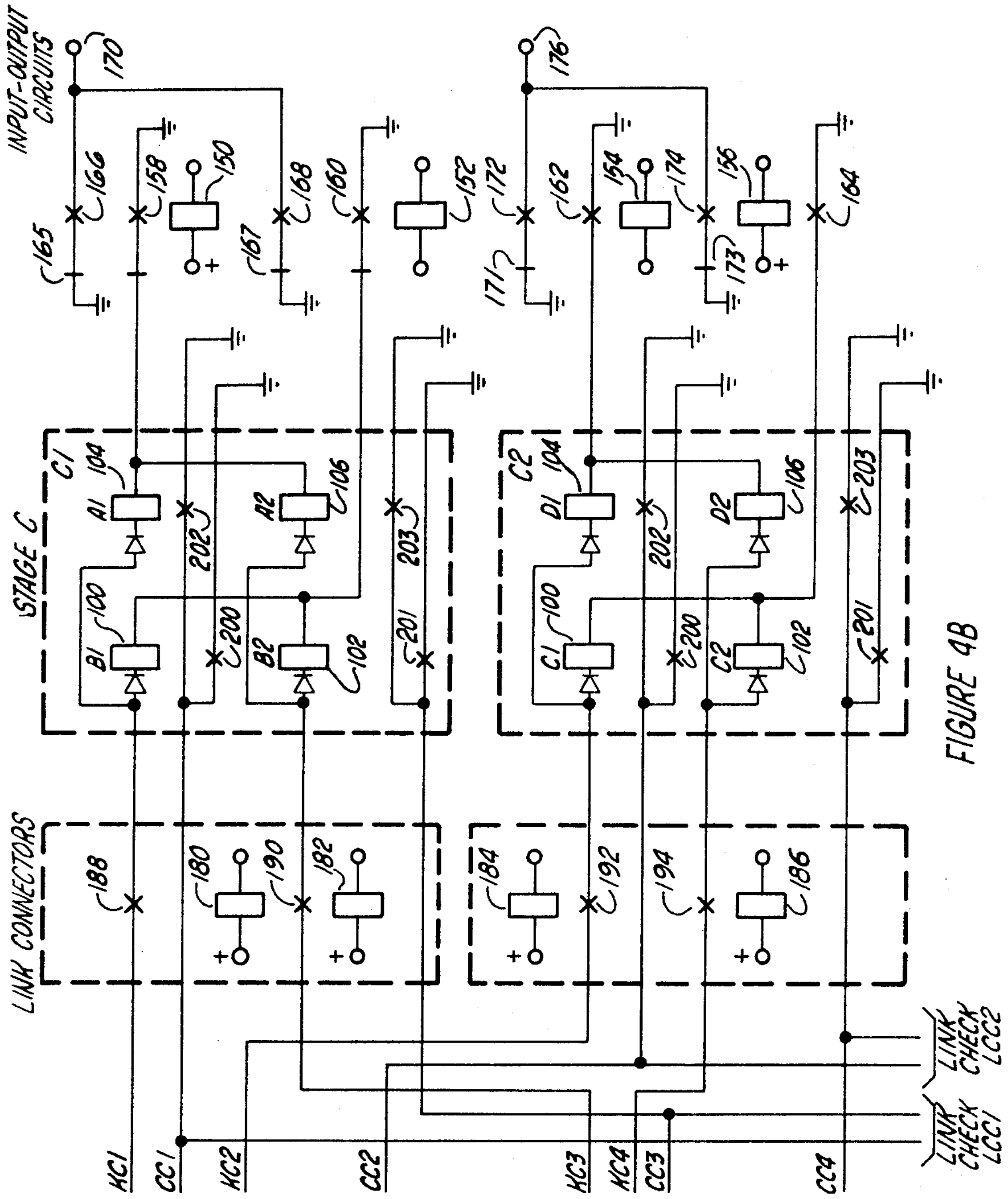

The switching network of FIG. 1 is illustrated in greater detail in FIGS. 4A and 4B, but simplified to include only two 2 × 2 matrix groups in each of the stages A, B and C, and to only include the mark lead and link check interconnections. The sleeve and tip and ring interconnections in FIGS. 4A and 4B can correspond to that illustrated in FIG. 3. Each of the matrix groups depicted includes four relays 100–106. The matrix groups of FIGS. 4A and 4B are interconnected to provide two possible mark paths and two corresponding link check interconnection circuits between any input-output circuit connected to the stages A and C. The mark link interconnections between the stage A matrix groups and stage B matrix groups are designated KA1 through KA4. The link check interconnections between the matrix groups of stage A and stage B corresponding to the links KA1 through KA4 are designated CA1 through CA4. The mark lead link interconnections between the matrix group in stages B and C are marked KC1 through KC4. The link check interconnections between the matrix group in stages B and C corresponding to the mark lead connections KC1 through KC4 are designated CC1 through CC4. The input-output circuits connected to the stage A matrix groups includes separate mark relays 120 through 126. The mark relay contacts 128 through 134, when closed, apply battery to its connected stage A matrix group. The normally open mark contacts 136 and 138 are connected to apply a ground signal via normally closed cut off relay contacts 137 and 139 to a terminal 140 that is connected to enable the link check circuit LCA1. Similarly, the normally open mark contacts 142 and 144 are connected to apply a ground signal via normally closed cut off relay contacts 141 and 143 to a terminal 146 that is connected to enable the link check circuit in LCA2.

The input-output circuits connectd to the C stage include mark relays 150 through 156. The mark relay contacts 158 through 164, when closed, apply a ground signal to its connected C stage matrix group. The normally open mark relay contacts 166 and 168 are connected to apply a ground signal via normally closed cut off relay contacts 165 and 167 to a terminal 170 connected to enable the link check circuit LCC1 and link connector LS1. Similarly, the normally open mark relay contacts 172 and 174 are connected to apply a ground signal via normally closed cut off relay contacts 171 and 173 to the terminal 176 that is connected to enable the link check circuit LCC2 and link connector LS2. A separate link connector relay 180 through 186 is provided for each of the links KC1 through KC4 with the normally open contacts 188 through 194, respectively, connected in series with its respective mark line.

In the embodiment of FIGS. 4A and 4B, each of the relays 100 through 106 in each of the matrix groups in stages A, B and C include normally open link check contacts 200 through 203, respectively. One end of the contacts 200 through 203 in the matrix modules in stages A and C are connected to ground. The other end of the link check contacts 200 through 203 are interconnected to form a matrix circuit through the stages B and C matrix groups so that when a connection through the network is completed, a ground will be applied by the link check contacts of the activated relays to the corresponding link check interconnections CA1 through CA4 and CC1 through CC4.

For example, assume that the mark relays 120 and 156 in the input-output circuits at opposite ends of the network are activated to request an interconnection. Two paths are available, one through matrix group B1, and the other through matrix group B2. The contacts 136 apply ground via terminal 140 to enable the link check circuit LCA1. Similarly, the contacts 174 apply ground via terminal 176 to enable the link check circuit LCC2 and also the link connector circuit LS2. The link check circuits LCA1 and LCC2 in unison check for ground at the link interconnections CA1 and CC1 corresponding to the path including links KA1 and KC2 and then subsequently check for a ground at a link interconnection CA2 and CC4 and corresponding to the path including links KA2 and KC4. At the same time that the link check circuits are scanning for a free path, the link connector relays 184 and 186 are also sequentially energized for a short period of time which is insufficient to close their contacts 192 and 914, respectively. Assuming that either of the links KA1, or KC2, or both, are busy, a ground will be applied to the link interconnections CA1, or CC2, or both, indicating that the path including links KA1 and KC2 is not available, therefore, the link scanner 10 (FIG. 1) will not stop, and the link connector contacts 192 will not close. Further, assuming that the links KA2 and KC4 are free, no ground will be present at the link interconnections CA2 and CC4 indicating a free path. Since the path including links KA2 or KC4 is free, the link scanner 10 is stopped and the link connector relay 186 is energized for a sufficient period of time to close the contacts 194. With mark contacts 128 and 164 closed, battery is applied to the matrix group A1 relays 100 and 102, and ground is applied to the matrix group C2 relays 100 and 102. Hence, when relay contacts 194 are closed, a path is completed via relay 100 in matrix group A1, relay 100 in matrix group B2 and relay 102 in matrix group C2. The path through the network is now completed as previously described with regards to FIG. 3.

It is to be understood, of course, that the link check contacts 200, 201, 202 and 203 can be eliminated in the matrix groups in stage B along with any link check interconnections to the link check contacts 200 through 203 the matrix groups in stages A and C. The link check contacts in the stages A and B will continue to be connected to the link check circuits LCA1 through LCA25 (for stage A) and link check circuits LCC1 through LCC12 (for stage C) as previously described. With such an arrangement, sufficient information is provided by the link check contacts in the stages A and B to define the busy-free status of the link interconnection of all the available paths through the network. The additional link check contacts in the matrix groups in the stage B and the link check interconnections provide an additional signalling path through the network as described in a copending patent application, Ser. No. 92,588, now U.S. Pat. No. 3,707,140, entitled "Switching Network Signalling System," filed for Klaus Gueldenpfennig, Uwe Pommerening and Stanley L. Russell, filed on Nov. 25, 1970 and is assigned to the assignee of the present application.

Figure 5:
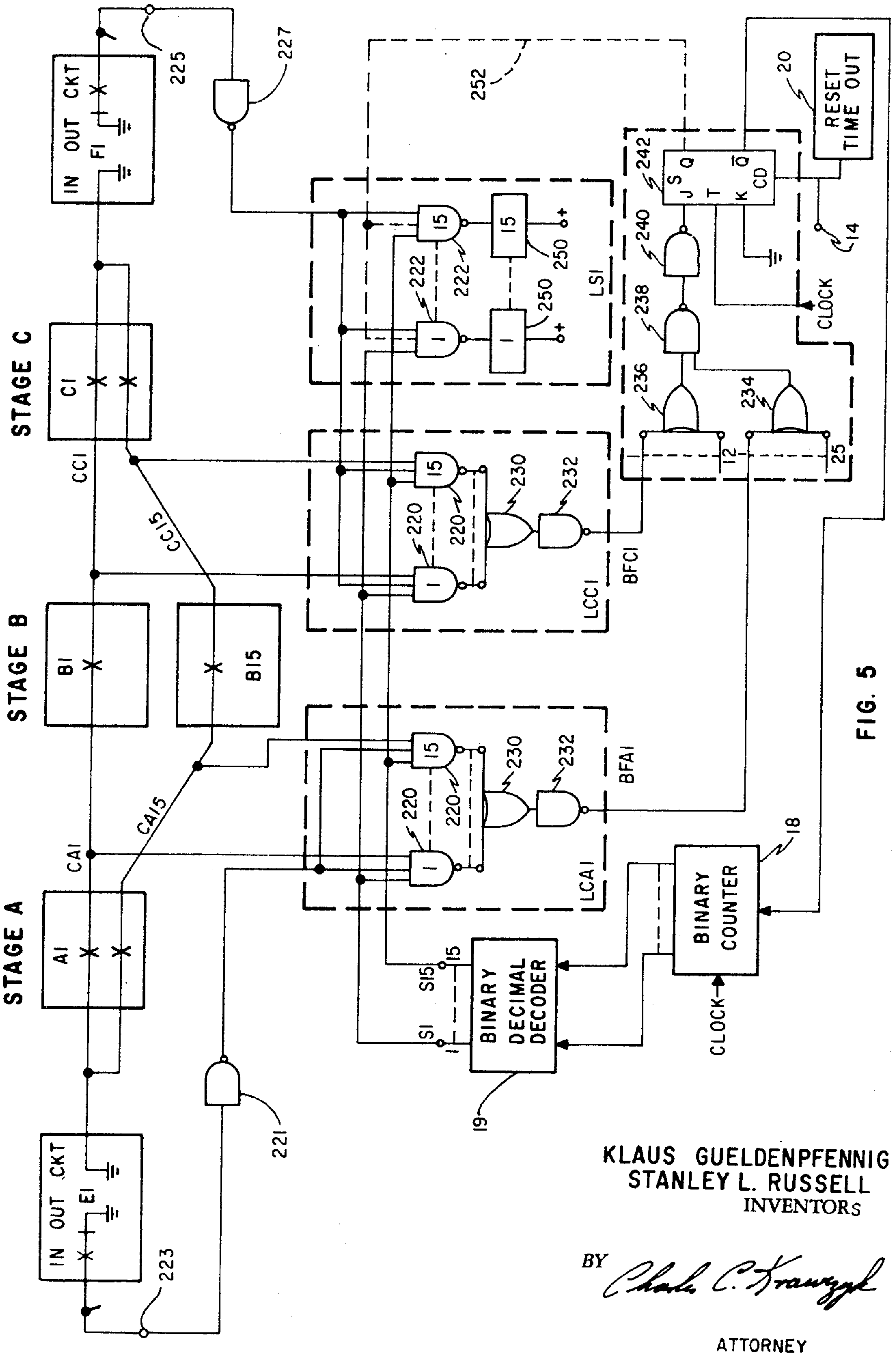
FIG. 5 is a logic diagram illustrating an embodiment of the link check circuits and link connector circuits of FIG. 1, and an embodiment of the comparator circuit of FIG. 2, interconnected in accordance with the path finding system of the invention.

FIG. 5 illustrates an embodiment of the logic circuit for the link check circuits LCA1 through LCA25, and LCC1 through LCC12, and link connector circuits LS1 through LS12. For purposes of simplifying the illustration, only one matrix group in stages A and C is shown, and only two matrix groups in stage B are shown, indicating two possible paths between the input-output circuits E1 and F1. The contacts in the matrix groups A1, B1, B15 and C1 correspond to the link check contacts 60 through 64 of FIG. 3 and 200 through 203 of FIGS. 4A and 4B. It is to be understood, of course, that with the 15 stage B matrix groups, 15 such paths are available. Furthermore, it is to be understood that the number of link check circuits and link connector circuits will correspond to the number of matrix groups in stages A and C. However, since only a single stage A matrix group and a single stage C matrix group is illustrated, only two matrix link check circuits LCA1 and LCC1 and one link connector circuit LS1 are included and the other link check and link connector circuits will be identical to those illustrated in FIG. 5. The link check circuits LCA1 and LCC1 include 15 NAND gate circuits 220, one for each of the link check interconnections to the matrix groups A1 and C1. One input circuit of each of the NAND gates is connected to a separate one of the link check interconnections CA1 through CA15 in a consecutive order with NAND gate No. 1 connected to CA1 and NAND gate No. 15 connected to CA15. In the same manner, gates of the link check circuit LCC1 are connected to the separate link check interconnections CC1 through CC15.

The link connector LS1 includes 15 NAND gates 222, a separate one for each of the links KC1 through KC15. The outputs of each of the NAND gates is connected to drive a separate one of 15 link connector relays 250. The contacts of the relays 250 are connected in series with different ones of the links KC1 through KC15.

Clock pulses are applied to the binary counter 18. The output of the counter 18 is applied to the binary decimal decoder circuit 19 to provide 15 sequential time spaced scanning pulses at the terminals S1 through S15. The terminals S1 through S15 are connected to separate ones of the 15 NAND gates 220 in the link check circuits LCA1 through LCA25, and LCC1 through LCC12, and to the 15 NAND gates 222 in the link connector circuits LS1 through LS12, so that each of the 15 NAND gates in the link check and link connector circuits (corresponding to the same path through the network) are simultaneously and sequentially partially enabled in consecutive order. All the third input circuits of the groups of 15 NAND gates 220 in the link check circuits LCA1 are connected to receive an enable signal from any of the input-output circuits E1 through E8 via the terminal 223 and an inverter 221. The terminal 223 is connected to receive a ground signal from any of the input output circuits E1 through E8 when requesting service in a manner (as illustrated in FIGS. 4A and 4B). All the third input circuits of the groups of 15 NAND gates 220 in the link check circuit LCC1 and all of the scond input circuits of the groups of 15 NAND gates 222 in the link scan circuits LS1 are connected to receive an enable signal from any of the input-output circuits F1 through F8 via a terminal 225 and an inverter 227. The terminal 225 is connected to receive a ground signal from any of the input-output circuits F1 through F8 when requesting service (as illustrated in FIGS. 4A and 4B).

The arrangement is such that when a request for service is present in one of its input-output circuit groups, all the NAND gates in the corresponding link check circuits, and all the NAND gates in the corresponding link connector circuit are partially enabled. For example, all the NAND gates in the link check circuit LCA1 are partially enabled by a signal from the inverter 221 indicating that the input-output circuit requesting service is connected to matrix group A1. In the same manner, all the NAND gates in the link check circuit LCC1 and the link connector circuit LS1 are partially enabled by a signal from the inverter 227 indicating that the input-output circuit requesting service is connected to the C1 matrix group.

In operation, the NAND gates in the link check circuits LCA1 and LCC1 and link connector LS1 receive a first partial enable signal from their respective input-output circuits. The NAND gates in the link check circuit LCA1 and LCC1 and link connector LS1 also receive second partial enable scanning pulses from the binary decoder 10 that are sequentially applied to each group of NAND gates in a consecutive order. Although both enabling signals are present at the link connector circuit LS1 as the selected link check circuit is scanned, the scanning rate which may be, for example, 250 kilohertz, is too rapid for the activation of the connector relays 250. The third enabling signal is applied to the NAND gates in the link check circuit LCA1 and LCC1 from the link check interconnections. Hence, the 15 NAND gates in the link check circuits are partially enabled by their input-output circuits and the scanning pulses from the circuit 10 to sequentially monitor individual pairs of link check interconnections (one interconnection between stages A and B and the other interconnection between stages B and C) in consecutive order and wherein the gates are fully enabled only when its connected link check circuit is not grounded.

The output circuits from the 15 NAND gates 220 in each of the link check circuits are connected to a NOR gate 230 which, in turn, is connected to inverter circuit 232. The output circuits of the inverter 232 from all the 25 A–B link check circuits (LCA1 through LCA25) are connected to separate inputs of a NOR gate 234. The output circuit of the NAND gate 232 from all 12 B–C link check circuits (LCC1 through LCC12) are connected to separate input circuits of a NOR gate 236. The outputs of the NOR gates 234 and 236 are connected to the inputs of a NAND gate 238. The output of the NAND gate 238 is connected through an inverter circuit 240 to the J input of a flip-flop 242. Clock pulses are applied to the T input of a flip-flop 242, while the K input is grounded. The $\overline{Q}$ output of the flip-flop circuit is connected to an inhibit circuit in the binary counter 18. A reset time out circut 20 is connected to the CD (reset) input of the flip-flop 242.

In operation when there is a request for connection, the NAND gates in one of the A–B link check circuits and in one of the B–C link check circuits and in a corresponding link connector circuit are enabled by their input-output circuits and high speed switching pulses from the binary decimal decoder 19 scan the group of NAND gates of the selected link check circuits and link connector circuit in consecutive order. When a free link check interconnection is located, a signal pulse is applied from the link check circuit to its corresponding NOR gate 234 or 236. When simultaneous signals appear at the input of both the NOR gates 234 and 236, a free path through the network has been located. The simultaneous presence of enable signals at both of the inputs of the NAND gate 238 applies a signal through the inverter 240 to "set" the flip-flop 242. The flip-flop 242, when "set," stops the binary counter 18. With the counter 18 stopped, the binary-decimal decoder 19 applies a continuous signal to one of the output leads S1 through S15 (corresponding to the links in the free path), which, in turn, enables the corresponding one of the 15 NAND gates 222 in the selected link connector circuit for a sufficient period of time to activate its connected link connector relay 250. As previously mentioned, the activated link connector relay closes a pair of contacts in the mark or control link in the network (such as contacts 188 through 194 in FIGS. 4A and 4B) and completes the free path between the two input-output circuits requesting service. After a period of time sufficient to complete the connections through the network and make the necessary metallic connection checks, a signal from the system timing is applied to terminal 14 to reset the flip-flop 242 and restarts the counting cycle of the binary counter 18 for another path finding sequence.

If the link connector relays 250 are replaced by semiconductor switches, the Q output of the flip-flop circuit 242 can be connected (as illustrated by the line 252 in phantom in FIG. 5) to a third input circuit in each group of 15 NAND gates 222 in the link connector circuits LS1 through LS12. The Q output of the flip-flop circuit 242 will inhibit the NAND gates 222 from responding the scanning pulses from the binary counter 18 until a free path has been found and the flip-flop circuit 242 is set.

Figure 6A:
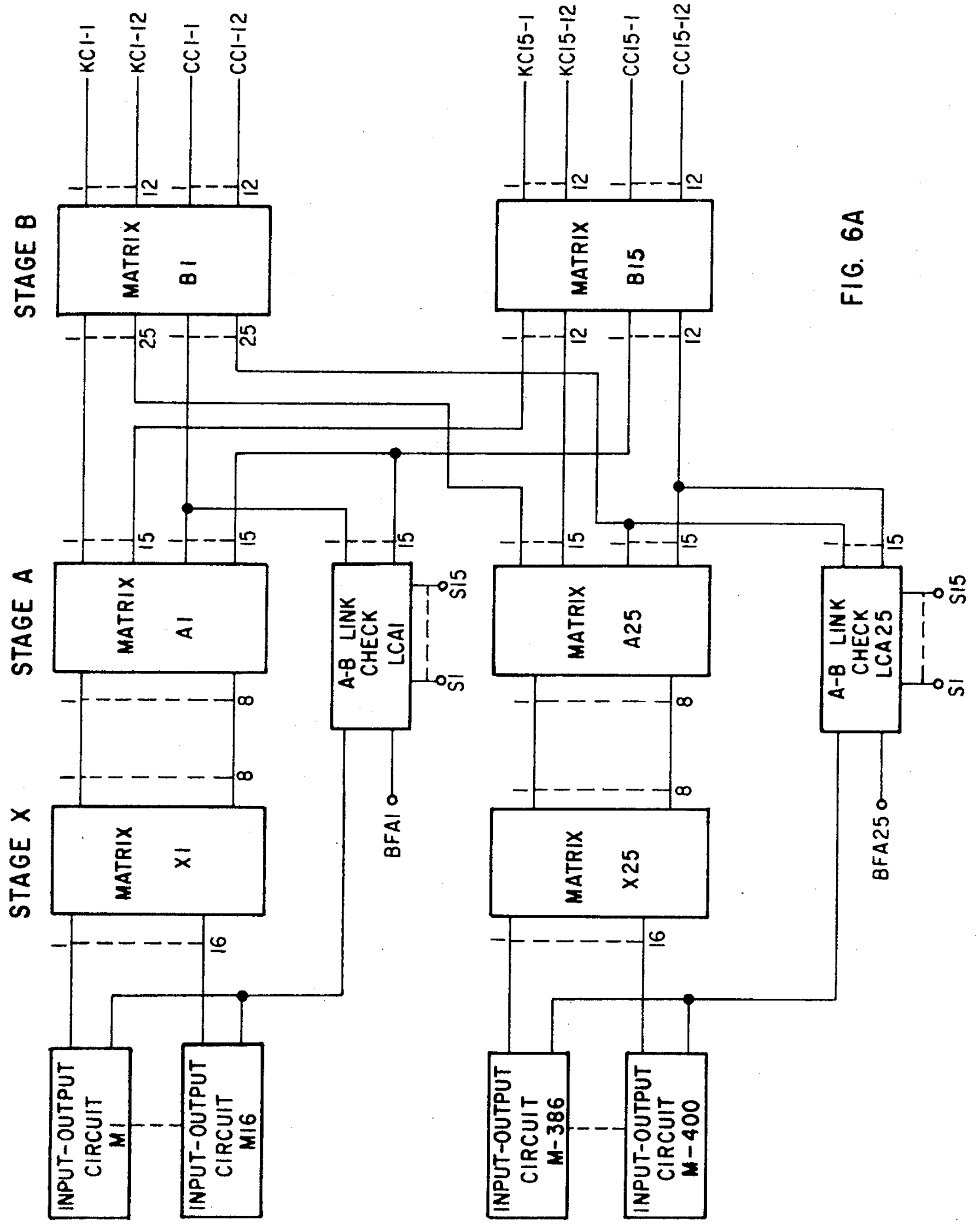
FIGS. 6A and 6B, in combination, include a simplified block diagram of a second embodiment of a switching network including the path finding system of the invention.
Figure 6B:
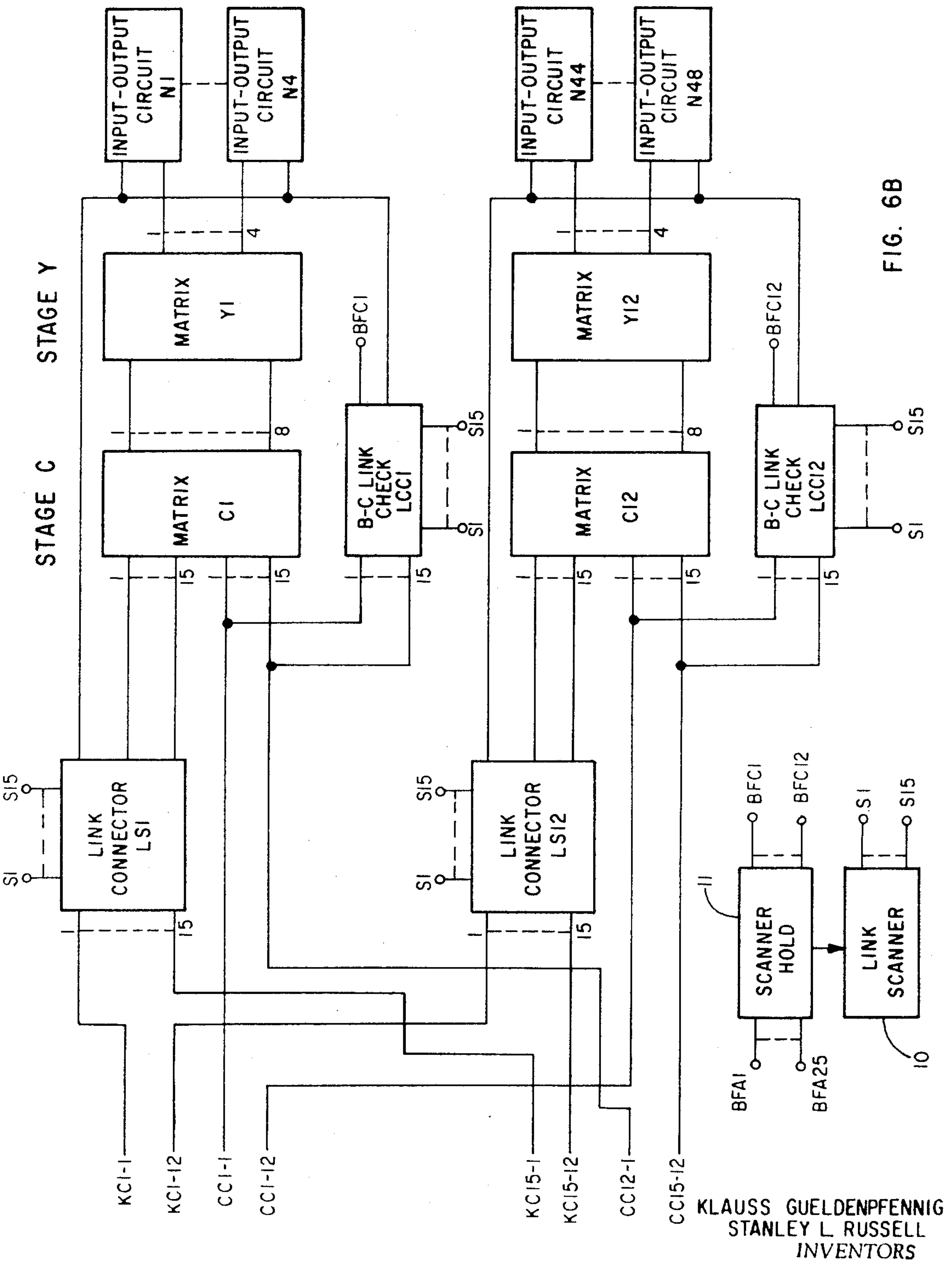

In FIGS. 6A and 6B, the path finding system of the invention is described in connection with the three stage network of FIG. 1 (stages A, B and C) modified to include two additional stages X and Y. For purposes of simplifying the description of the system of FIG. 6, wherever the same circuits or blocks are employed in both FIGS. 1 and 6, such circuits are designated by the same reference letters and numerals. The stage X includes 25 matrix groups X1 through X25, a separate one for each of the stage A matrix groups A1 through A25. The stage Y includes 12 matrix groups Y1 through Y12, a separate one for each of the stage C matrix groups C1 through C12. The stage X matrix groups X1 through X25 are connected to the separate ones of the stage A matrix groups A1 through A25, respectively, to provide a fan-out matrix arrangement to the input-output circuits M1 through M400. The input output circuits are connected in groups of 16 to the individual stage X matrix groups. The stage Y matrix groups Y1 through Y12 are connected to separate ones of the stage C matrix groups C1 through C12, respectively, to provide a concentrator type of matrix arrangement to the input-output circuits N1 through N48. The input-output circuits N1 through N48 are connected in groups of four to the individual stage Y matrix groups.

The input-output circuits M1 through M400 are connected to the link check circuits LCA1 through LCA25 in accordance with their connections to the matrix modules X1 through X25 in the same manner as the connections of the input-output circuits E1 through E200 of FIG. 1. When a request for service is made by one of the input-output circuits M1 through M400, the input-output circuit enables one of the link check circuits LCA1 through LCA25 corresponding to the stage A matrix group connected to the stage X matrix group coupled to the input-output circuit requesting service. The input-output circuits N1 through N48 are connected to the link check circuits LCC1 through LCC12 and the link connectors LS1 through LS12 in accordance with their connections to the matrix modules Y1 through Y12 in the same manner as the connections of the input-output circuits F1 through F96 in FIG. 1. When a request for service is made by one of the input-output circuits N1 through N48, one of the link check circuits LCC1 through LCC12 and one of the link connector circuits LS1 through LS12 are enabled corresponding to the stage C matrix group connected to the stage X matrix group coupled to the input-output circuit requesting service.

The path finding procedure is essentially the same as that explained with regards to FIG. 1 wherein the link check circuits simultaneously compare the busy-free status of the A–B links and B–C links defining the available paths between two marked input-output circuits at opposite ends of the network. When both of the link check circuits simultaneously locate corresponding free A–B and B–C links, the scanning procedure is stopped. The link connector circuit is energized for a sufficient period of time to complete the connections through the stages A, B, C, X and Y and complete the path between the two input-output circuits requesting service. In effect, the addition of the stage X and Y matrix groups function as merely expansions to the stage A and C matrix groups, wherein, for practical considerations, the interconnected matrix groups in stage X and A, and in stage C and Y can be considered as unitary matrix groups made up of several matrix switches, i.e., the matrix groups X1 and A1 can be considered a single matrix group, and the matrix groups C1 and Y1 can be considered to be a single matrix group, etc.

Figure 7A:
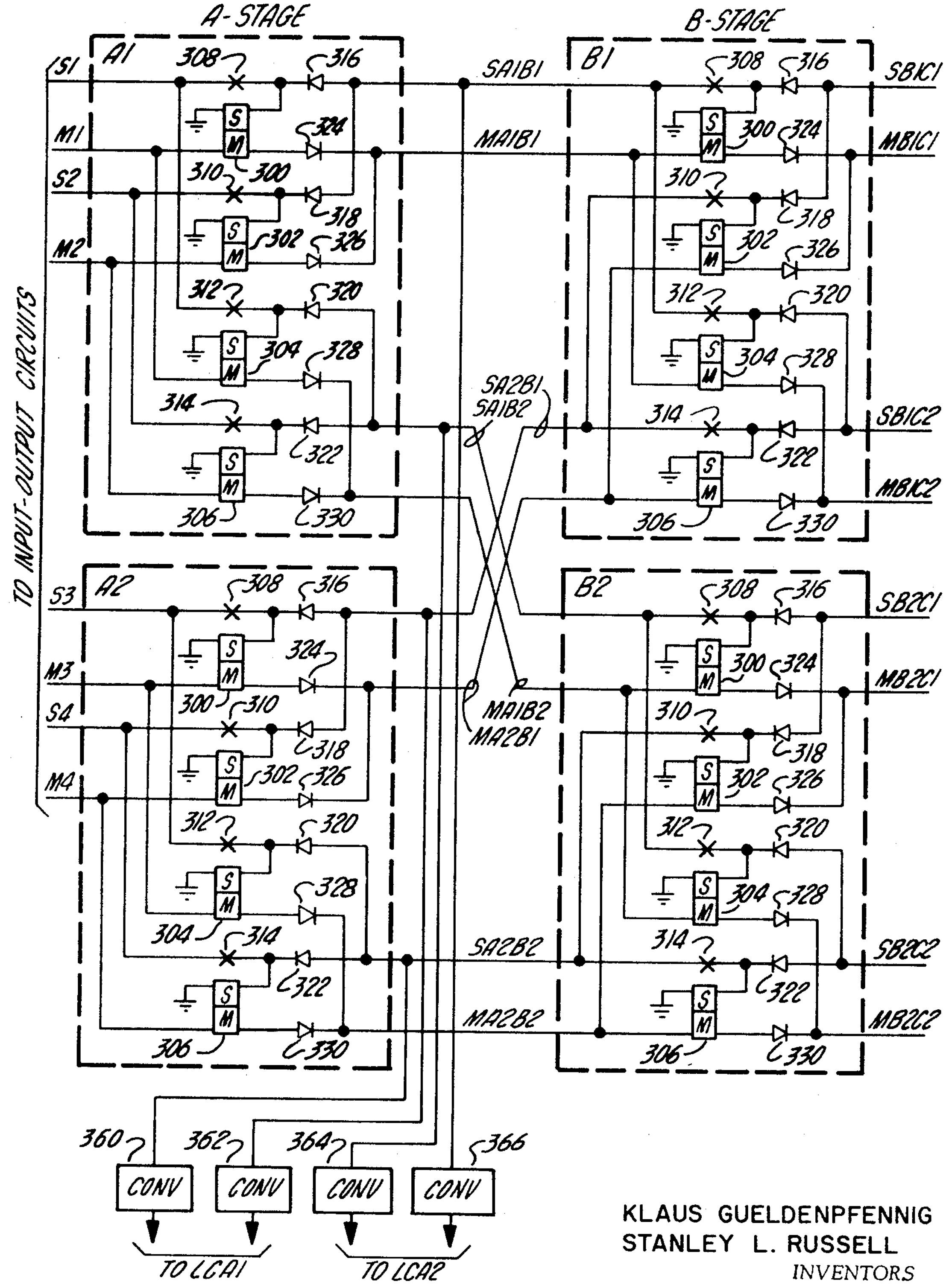
FIGS. 7A and 7B, in combination, include a second embodiment of the path finding system of the invention.
Figure 7B:
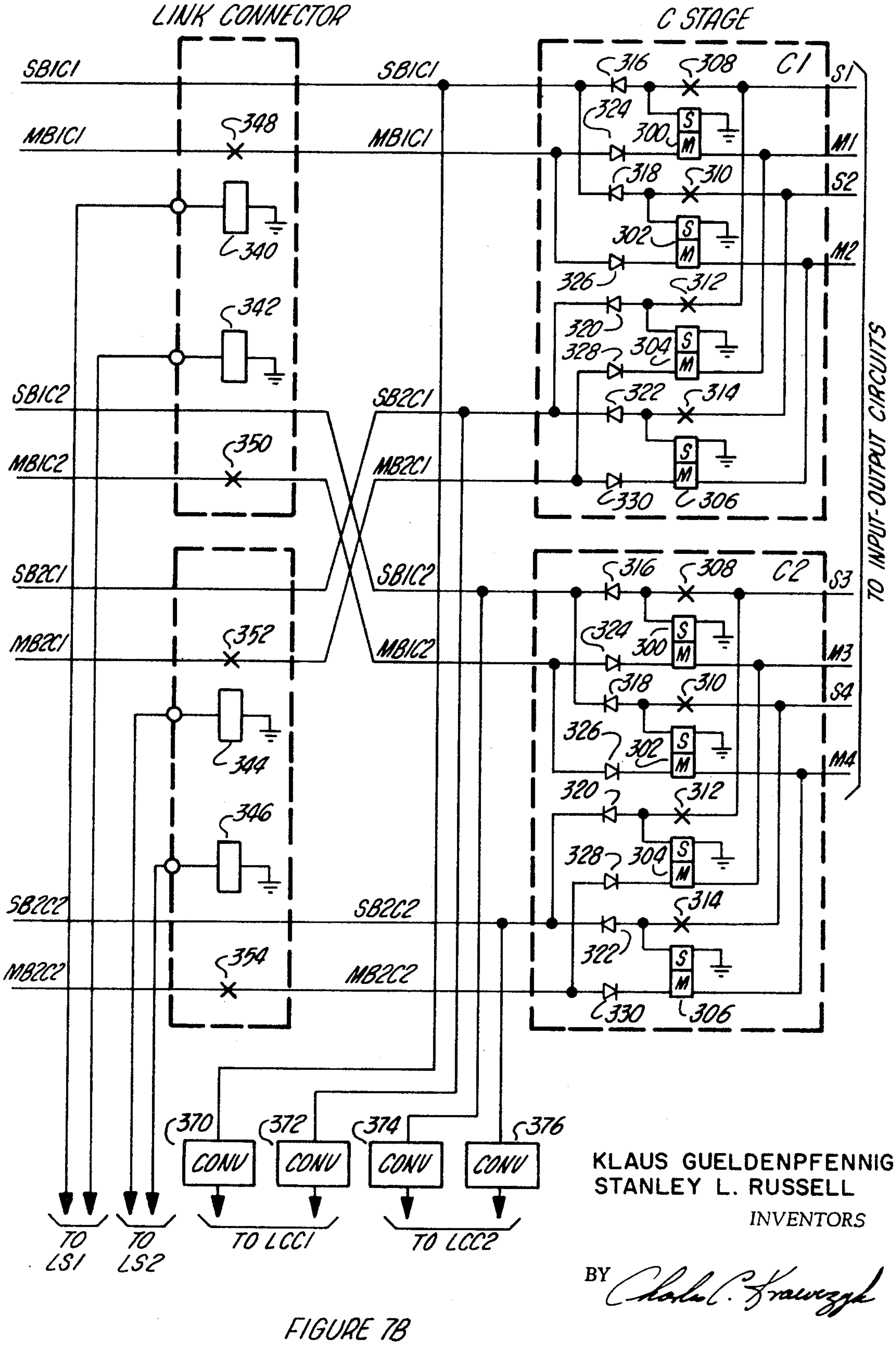

FIGS. 7A and 7B includes a second embodiment of the path finding system of the invention wherein the busy-free condition is determined by whether or not a potential is applied to the hold coil of various crosspoint relays in the network. The switching network of FIGS. 7A and 7B is a three stage (A, B and C) network wherein each stage is divided into separate matrix groups. For purposes of simplifying the explanation of the invention, each stage is illustrated as having two matrix groups (A1 and A2, B1 and B2, C1 and C2). Each of the matrix groups in the simplified network includes four crosspoint relays 300 through 306. However, it should be understood that the path finding system of the invention will function with a network with stages having any number of matrix groups and the matrix groups can have any number of cross-point relays. Each of the crosspoint relays includes a mark (lower) coil M and a sleeve (upper) coil S. The arrangement is such that the relays are activated by first energizing the mark coil to actuate the relay wherein the contacts of the activated relay complete the circuit for the hold coil. After the hold coil is energized, the circuit for the mark coil is opened and the connection is maintained by the hold coil.

The diodes 324 through 330 are connected in series with one end of the mark coils of the relays 300 through 306, respectively. One end of the sleeve coils of the relays 300 through 306 is connected to ground, while the other end is connected between the junction of one of its relay contacts (308 through 314) and a diode (316 through 322). One end of mark coils in the stage A matrix is connected to the input-output circuits at one end of the network, while the other end is connected to one end of the mark coils in the stage B matrix groups via the mark link interconnections MA1B1 through MA2B2 and the diodes 324 through 330. The other end of the mark coils in the stage B matrix groups are connected to one end of the mark coils in the stage C matrix groups via the mark link interconnections MB1C1 through MB2C2 and the diodes 324 through 330. The other end of the mark relay coils in stage C are connected to the input-output circuits at the other end of the network. The ungrounded end of the sleeve coils of the relays in the stage A matrix groups are connected to one end of the sleeve coils in the stage B matrix groups via sleeve link interconnections SA1B1 through SA2B2, diodes 316 through 322 and contacts 308 through 314, and also are connected to one end of the sleeve coils in the stage C matrix groups via the sleeve link interconnections SB1C1 through SB2C2, diodes 316 through 322 (stage B) and diodes 316 through 322 (stage C). The arrangement of the network of FIGS. 7A and 7B is such that two paths (one through matrix group B1 and the other through matrix group B2) are available between any input-output circuit connected to the stage A matrix groups and any of the input-output circuits connected to the stage C matrix groups.

In accordance with the invention, a link connector circuit is connected between the stage B and C matrix groups including the connector relays 340 through 346, each having separate contacts 348 through 354 connected in series with individual ones of mark links MB1C1 through MB2C2, respectively. In addition, the sleeve links SA1B1 through SA2B2 are connected to the link check circuits LCA1 and LCA2 via the converter circuits 360 and 362, and 364 and 366, respectively. The sleeve links SB1C1 through SB2C2 are connected to the link check circuits LCC1 and LCC2 via converter circuits 370 and 372, and 374 and 376, respectively. The output of the converter circuits 360 and 362 are connected to separate ones of the NAND gates 220 (FIG. 5) of the link check circuit LCA1. The output of the converter circuits 364 and 366 are connected to separate ones of the NAND gates 220 of the link check circuit LCA2. The output of the converter circuits 370 and 372 are connected to separate ones of NAND gates 200 of the link check circuits LCC1. The converters 374 and 376 are connected to separate ones of the NAND gates 220 of the link check circuit LCC2. The converter circuits function to provide a signal (such as ground) when its connected sleeve link is busy. It should be noted, however, that the converter circuits 360 through 366 and 370 through 376 can be eliminated and the link check circuits can be converted to operate with a high voltage level rather than a ground signal.

In operation, the mark leads at the opposite ends of the network are marked as previously described with regards to FIGS. 1, 3, 4A, 4B and 6. The marked input-output circuits supply a first partial enable signal to select: 1) the corresponding one of the stage A link check circuits; 2) the corresponding one of the stage C link check circuits, and 3) the corresponding ones of the link connector circuits. The scanning pulses are applied to the selected link check circuits and the selected link connector circuit for sequentially enabling the NAND gates 220 and 222 (FIG. 5) as previously described. In the network of FIGS. 7A and 7B, if a crosspoint relay is busy, its sleeve link will be at a high potential. The high potential is converted to a busy (ground) signal by its connected converter circuit. Hence, the path finding system of the invention will continue to scan the network until a pair of available sleeve links corresponding to a free path through the network is located, at which time, the scanning is stopped and the corresponding link connector relay is energized.

For example, assume that mark leads M1 on opposite ends of the network are marked for connection, and assume further that the relay 302 in matrix group B is busy. The link check circuits LCA1 and LCC1 and the link connector circuit LS1 will be enabled. A high potential (busy signal) will be present at the sleeve link SB1C1. The converter circuit 370 will accordingly apply a busy signal to the NAND gate 220 in the link check circuit LCC1 indicating the busy condition in the first path (including relays 300 in matrix groups A1, B1 and C1) and the path finding scheme will then scan the other available path (relays 304 in matrix groups A1 and C1 and relay 300 in matrix group B2). If the relays 304 in matrix groups A1 and C1 are free, and the relay 300 in module B2 is free, no high potential will be present on either of the sleeve links SA1B2 and SB2C1. The converter circuits 364 and 372 will therefore simultaneously apply a free (ungrounded) signal to the respective link check circuits LCA1 and LCC1 indicating a free path has been found. The scanning will stop as previously set forth and the connector relay 342 will be energized to close contacts 350 and complete the connection through the matrix.

Although the sleeve coils of FIGS. 7A and 7B are illustrated with one end of the coils connected to ground, it is to be understood that other types of parallel circuit arrangements are possible, such as for example, replacing the ground connection to the coils with a connection to a power supply terminal. In such an arrangement, a low potential approaching ground will be present at the sleeve link interconnection when one of the connected relays are actuated. The converter circuits in this case will respond to the low potential on its connected sleeve link interconnection to produce the ground signal output indicating the sleeve link is busy.

With the path finding system of the invention, the plurality of available paths through the network is sequentially scanned in a manner so that the links and the crosspoints that define complete paths through the network are simultaneously monitored and a free path is located in a single path finding cycle. With the network illustrated in FIG. 1, if a free path is available, the path finding system of the invention will locate the free path in less than 100 microseconds from the time the input-output circuits on opposite ends of the network are marked. However, the time for completing the connection through the network if employing relay crosspoint devices, is substantially longer than the path finding cycle. Added time is required to allow the link connector relay and the matrix relays to pick up. Further, in order to assure that a complete connection has been made, a check is also generally made on the metallic connections through the tip and ring contacts. Hence, a period of time, such as for example, 10 milliseconds, can be allotted for completing the path finding and interconnecting sequence. In the event a faulty connection has been made, a second path finding and interconnecting sequence can be completed in an additional 10 milliseconds. With this type of timing sequence, a plurality of DID type calls can be handled simultaneously within a dialing interdigital period, thereby assuring that the simultaneous DID calls will not be lost.

The size of a network used in telephone switching systems depends upon traffic to be handled. The networks can include one, two, three, five and six stage networks as determined mostly by traffic considerations and the cost of the network. The cost of the network is generally determined by the number of crosspoints therein. In most larger types of systems, at least a three stage type of network is used. There is a relation between traffic to be handled by the network and a number of crosspoints required in such a network. In an article by L.K. Pollen, entitled "Design Tables For Optimum Non-Blocking Crosspoint Networks," in the April 1966 publication by Sylvania Electronic Systems-East, the relationship between the size of the network, the number of stages and the number of crosspoints of such networks is fully discussed.

With three stage type networks, if the amount of traffic increases, the center matrix stage grows as a squared function, wherein the size of the center stage grows in both the X and Y directions. The use of a five or six stage network allows the center matrix stage to be broken up into smaller groups so that the overall size of the matrices in the center group (for the same traffic handling capabilities) is much smaller than the matrices in the three stage matrix. As mentioned in the above-identified article, there is a crossover point in which it is cheaper to use a five or a six stage network than the three stage network because there are less crosspoints required. However, in the past, the use of the five or six stage network has been rather limited, since as the number of stages increases, the complexity of the control system for the path finding system generally increases. The path finding system of the present invention can serve to locate paths through a five or six stage network as well as a three stage matrix in the same manner as previously described, however, modified only in accordance with the number of link circuits to be monitored.

Figure 8A:
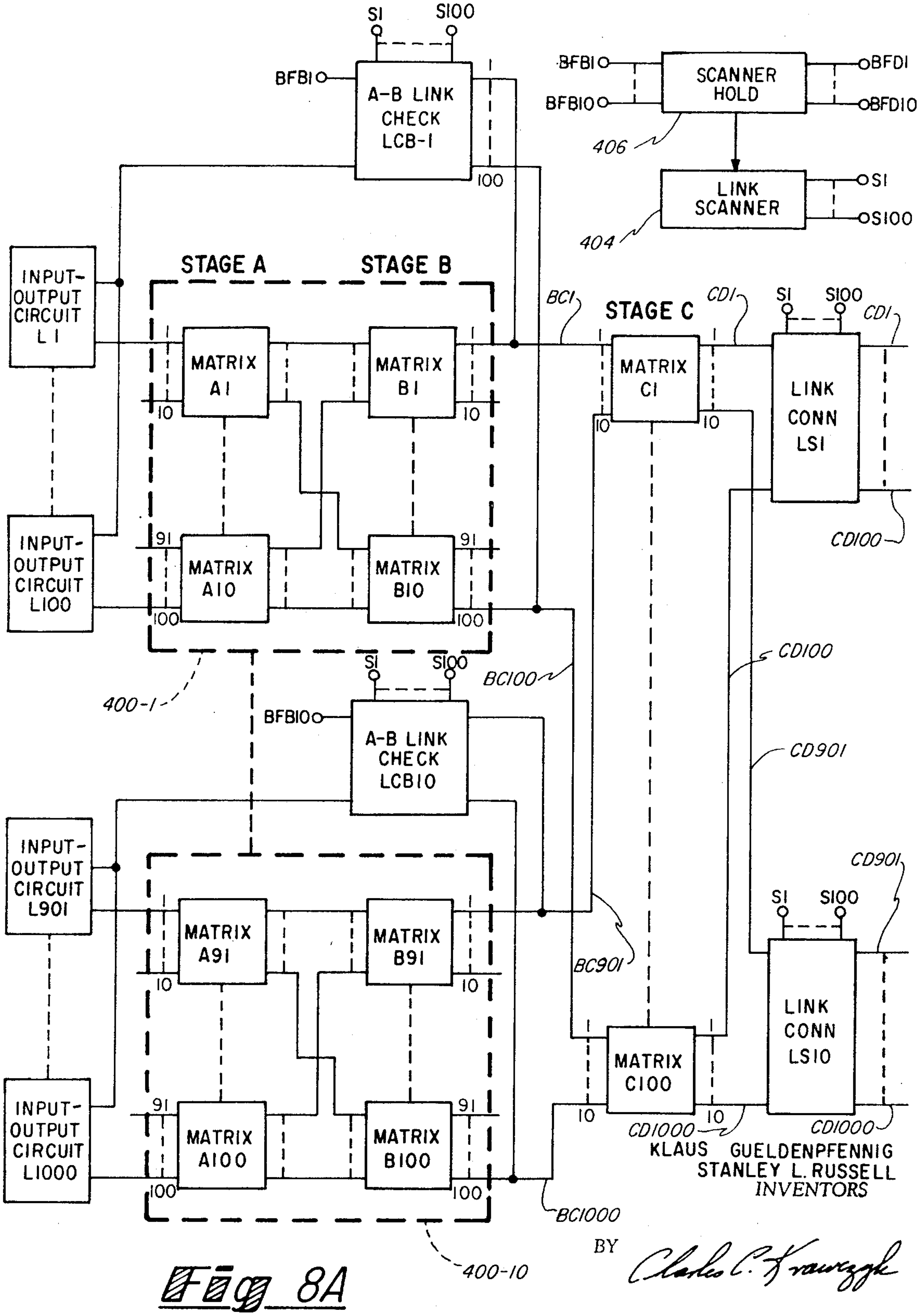
FIGS. 8A and 8B, in combination, include a block diagram of a five stage network including the path finding system of the invention.
Figure 8B:
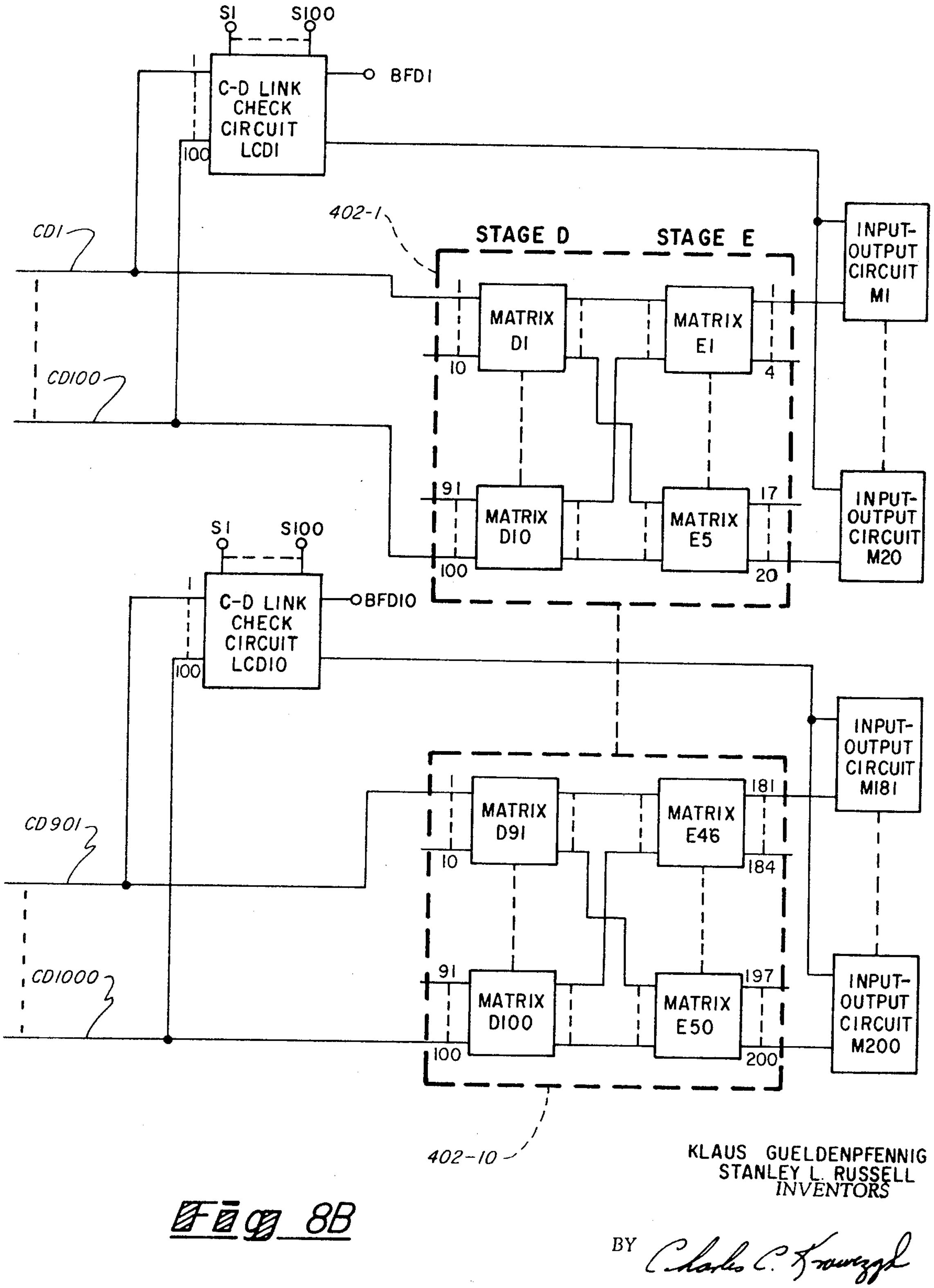

FIGS. 8A and 8B include the path finding system of the invention in connection with a five stage (A, B, C, D and E) full availability switching network. Each stage includes a plurality of matrix groups which are connected so that to provide, in the multistage network depicted wherein for purposes of illustration, 100 possible connections between any one of the input-ouptut circuits at one end of the network to any of the input-output circuits in the other end of the network. For purposes of illustration, 1,000 input-output circuits (L1 through L1000) are connected to the stage A and 200 input-output circuits (M1 through M200) are connected to the stage E. The stage A includes 100 matrix groups (A1 through A100) with 10 seprate input-output circuits connected to each matrix group. The stage B includes 100 matrix groups (B1 through B100). Each group of 10 matrix groups in stages A and B are interconnected to form a double entry two stage network (within the dashed blocks 400–1 through 400–10) wherein any of the input circuits connected to one of these two stage networks can be connected through a single unique path to any one of the links connected to the other side of the two stage network.

The center stage C includes 100 matrix groups (C1 through C100). The stage D includes 100 matrix groups (D1 through D100). The stage E includes 50 matrix groups (E1 through E50) with four input-output circuits connected to each matrix group. The matrix groups in stages D and E are interconnected to provide 10 individual double entry two stage networks (402–1 through 402–10), each including 10 stage D matrix groups and five stage E matrix groups. Each two stage network provides a unique path for connecting any one of the input-output circuits connected to one side of the two stage networks to any link connected to the other side of the two stage networks.

The matrix groups in the stages B, C and D are interconnected by link check interconnections in an arrangement wherein any one of the input circuits connected to the stage A (L1 through L1000) can be interconnected via the multistage network by any one of 100 paths to any of the input-output circuits (M1 through M200) connected to the stage E. Each of the matrix groups or modules in the stages A, B, C, D and E can, for example, include an additional set of contacts for each of the crosspoints in the module for link check purposes as previously described with regards to FIGS. 1, and 3–6B, and wherein the link interconnections illustrated in FIGS. 8A and 8B correspond to the link check interconnections of FIGS. 1 and 3–6B. Since stage C includes a plurality of single matrix modules, the link check contacts and link connections thereto can be eliminated, if desired, as previously set forth. Alternatively, the sleeve leads can provide the busy-free signal as illustrated in FIGS. 7A and 7B, and therefore in such case the interconnecting links will correspond to the sleeve links. It is to be understood, of course, that the switching network, in addition to the link check interconnections, will inlude the tip, ring, mark and sleeve link connections as disclosed in FIG. 3, however, including five stages A, B, C, D and E. With regards to the explanation of the network and path finding system of FIGS. 8A and 8B, the term link check interconnection or link interconnection will refer to the crosspoint link check arrangement and/or the sleeve lead link check arrangement.

A plurality of link connector circuits (LS1 through LS10) of the type illustrated in FIGS. 3, 4A, 4B and 5 are connecged in series with the mark link interconnections between the stages C and D. It is to be understood, of course, that the link connector circuit can be also connected in series with the mark link interconnection between stages B and C. A separate link connector circuit is provided in FIG. 8B for each of the two stage networks 402–1 through 402–10. The link connectors include separate switching means in series with individual ones of the mark link interconnections and will function, when actuated, to complete a mark connection through the network.

The link check connections provide a signal indicating the busy-free status of the corresponding links, as previously described. A separate link check circuit (LCB1 through LCB10) is provided for each of the two networks 400–1 through 400–10. The link check circuits LCB1 through LCB10 are coupled to the link check interconnections to monitor the busy-free status of the link interconnections extending therefrom. In addition, a separate link check circuit (LCD1 through LCD10) is provided for each of the two stage networks 402–1 through 402–10. The link check circuits LCD–1 through LCD–10 are coupled to the link check interconnections to monitor the busy-free status of the 100 link interconnections extending to each of the two stage networks. The link check circuits LCB1 through LCB10, and LCD1 through LCD10, are identical to those disclosed in FIG. 5, however, having a separate input gate for each of the links connected to the two stage networks (which in this present example would be 100 gates).

Each of the link check circuits to be connected is enabled by the input-output circuits connected to its corresponding two stage network. For example, the link check circuit LCB1 is enabled by a request for service from any of the input-output circuits L1 through L100 connected to the two stage network 400–1. Likwise, the link check circuit LCD1 is enabled by a request for service by any of the input-output circuits M1 through M20 connected to the two stage network 402–1. A separate link check circuit LS1 through LS10 is provided for each of the link check circuits. Selecting a link check circuit automatically selects the corresponding link connector circuit. Hence, it can be seen that when the input-output circuits on opposite ends of the network are marked for connection, the corresponding two link check circuits and one link connector circuit are automatically enabled.

The link check circuits LCB1 through LCB10, the link check circuits LCD1 through LCD10, and the link connector circuits LS1 through LS10 are connected as to receive sequential scanning pulses from a common link scanner circuit 404 of the type disclosed in FIG. 2 via terminals S1 through S100. With 100 link interconnections available for each of the two stage networks at opposite ends of the multistage network, 100 sequentially timed pulses are applied to the terminals designated S1 through S100 for scanning through the selected groups of link check interconnections to determine the busy-free status of the corresponding link interconnections. For example, if the input-output circuit L1 is to be connected to the input-output circuit M1, the link check circuits LCB1 and LCD1 and the link connector circuit LS1 are enabled. There are 100 possible connections between the input-output circuits L1 and M1, with each path going through a different C stage matrix group. When the link check and link connector circuits are enabled, the scanning pulses applied to the link check circuits allow the two enabled link check circuits to synchronously and sequentially monitor (scan) the busy-free conditions of the link check interconnections comprising each of the available 100 paths and to allow the link connector circuit to simultaneously select the mark link interconnection between stages C and D as the corresponding link check interconnections are being monitored. The enabled link connector circuit, in this case LS1, scans along in synchronism with the two link check circuits to sequentially drive the link connector switches. The repetition rate of the scanning pulses is sufficiently high so that the connector switches do not respond to the scanning pulses.

The link check circuits LCB1 through LCB10, when enabled, scan the various link check interconnections to produce corresponding busy-free signals at the terminals BFB1 through BFB10, respectively. The link check circuits LCD1 through LCD10, when enabled, scan the various link check interconnections to produce corresponding busy-free signals at the terminals BFD1 through BFD10, respectively. The busy-free signals occur in synchronism between corresponding BF terminals due to the use of the common link scanner 404 for all link check circuits. If a simultaneous free signal appears in corresponding links connected to the two stage networks at opposite ends of the multistage network, a free path through the network has been found. The busy-free terminals BFB1 through BFB10 and BFD1 through BFD10 are connected to the scanner hold circuit 406 of the type illustrated in FIG. 2 and FIG. 5 that detects the simultaneous occurrrence of a free signal. When a simultaneous free signal is present in these termianls, the scanner hold circuit 406 applies a stop signal to the link scanner circuit 404 for a sufficient period of time to allow the corresponding switch means in the link connecor circuit and the crosspoint devices in the network to pick up and complete the connnections through the network.

Figure 9:
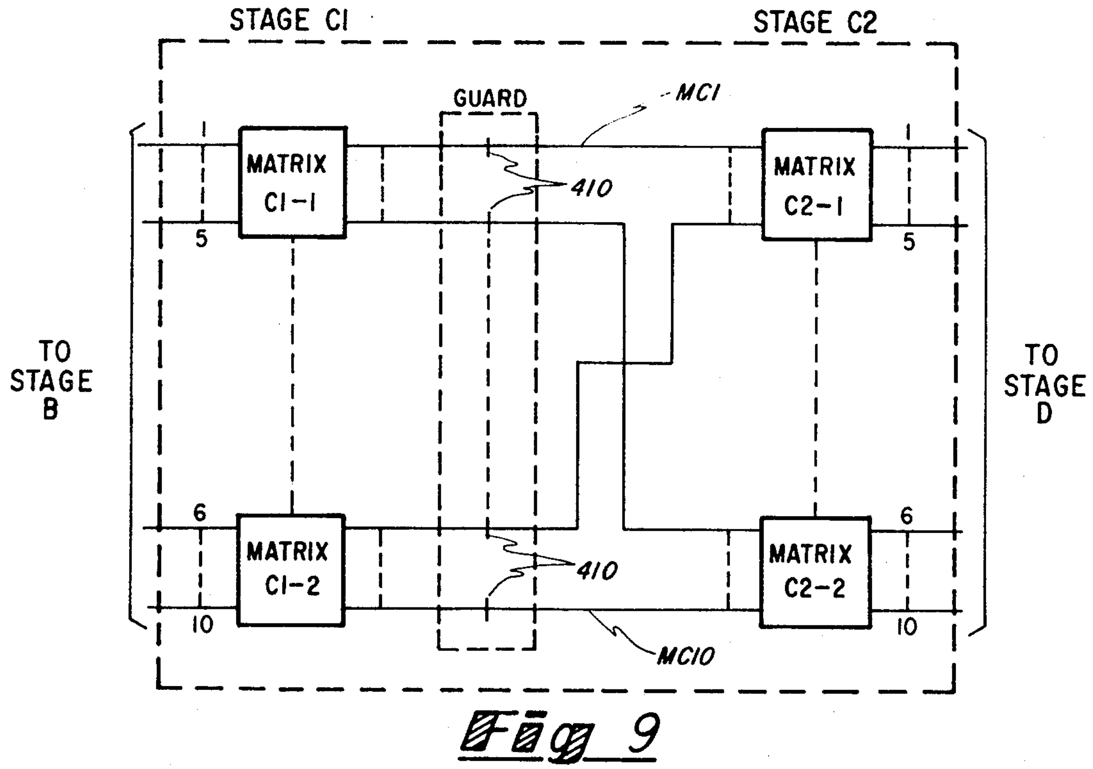
FIG. 9 includes a modification of one of the stages of FIGS. 8A and 8B to form a six stage network.
Figure 10:
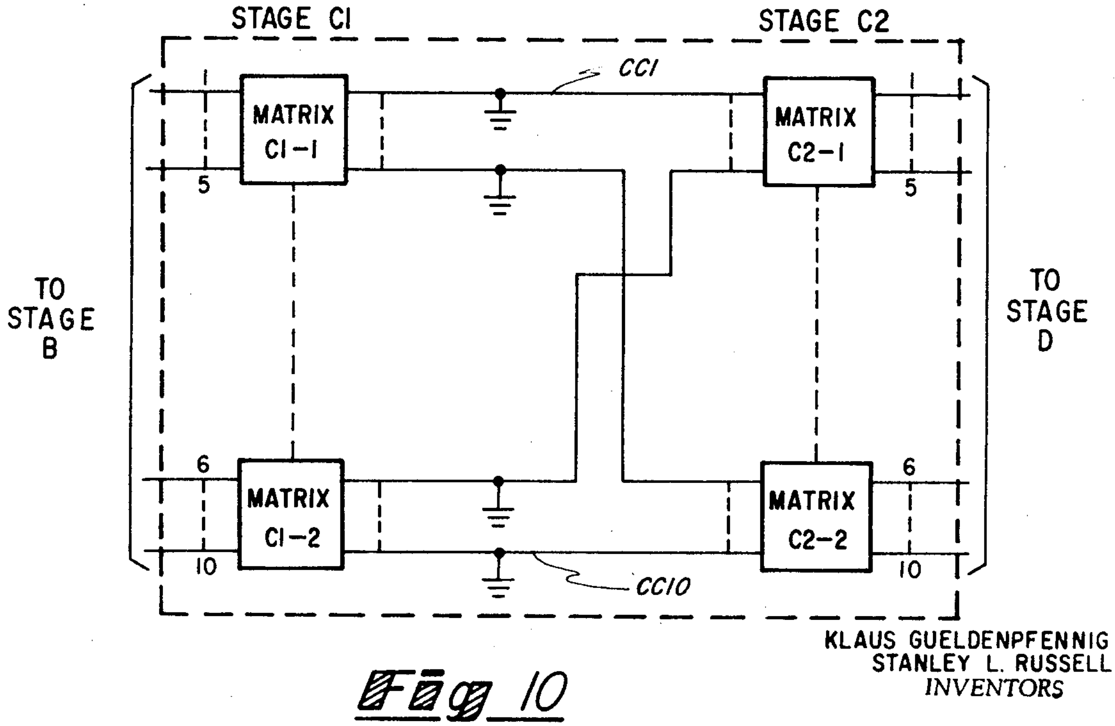
FIG. 10 includes another modification of one of the stages of FIGS. 8A and 8B to form a six stage network.

FIGS. 9 and 10 include a modification for the network of FIGS. 8A and 8B for expanding the multistage network into a six stage network wherein stage C is expanded to two separate stages C1 and C2. For purposes of illustration, each of the matrix groups C1 through C100 are divided into four separate matrix groups which are interconnected to form a two stage network wherein any of the links from stage B can be connected via any one of 10 paths to the links extending to stage D.

The two stage network illustrated in FIG. 9 includes a guard relay contact connected in series with each of the mark link interconnections. The relay controlling the actuation of the guard relay contact is connected to the sleeve lead corresponding to the mark link. If a link is busy, its guard relay contacts will be open preventing any connections therethrough. The path finding system of the invention will function to select a pair of free links, and then will close the corresponding link connector contacts in an attempt to complete the connections between the mark circuits on opposite ends of the network. If the pair of links selected include a busy link between stages C1 and C2 (the guard relay contacts are open), the connection cannot be completed, and therefore, after a time out period has been expired, the path findings system will again start a new sequence in an attempt to complete the interconnection.

FIG. 10 includes a preferred method of interconnecting the stages C1 and C2 as a two stage network. In FIG. 10, the links interconnecting stages C1 and C2 correspond to the link check interconnections and the matrix modules include an extra link check contact to provide the busy-free signal indication. Each of the link check interconnections between stages C1 and C2 is connected to ground so that if a link is busy (the corresponding link check contacts in stages C1 and C2 are closed), a signal ground will be transmitted to the link check interconnections between stages B and C1 and between stages C2 and D signalling that the corresponding link circuits in that path is busy between stages C1 and C2. When a free path is available through all three of the tandem two stage networks (stages A and B, stages C1 and C2, and stages D and E), the corresponding relay in the link connector circuit will be actuated completing the free connection through the multistage network.

It should be noted that the path finding system of the invention functions essentially the same with each of the three, five and six stage networks. Only one scan of the available paths is required. The scanning rate can be sufficiently high so that the time required to scan a large number of link check interconnections can be small as compared to the time required to actuate the matrix relays and therefore a large increase in the number of link check circuits to be monitored will not substantially increase the time required for path finding. In the path finding disclosed in FIGS. 1–7B, the path finding system of the invention checks the availability of two groups of links between the matrix stages. In FIGS. 8A and 8B, the path finding system of the invention checks the availability of four link interconnections, i.e., the links between the two stage networks of stages A and B and D and E and the links extending to stage C. For networks modified in accordance with FIGS. 9 and 10, the path finding system effectively checks for the availability of five sets of links wherein an additional set of links extends between the stages C1 and C2. In addition to the foregoing, if added traffic handling capability is required, further stages can be added to opposite ends of the multistage network of FIGS. 8A and 8B to expand the network capacity in accordance with the expansion stages A and C of the FIGS. 6A and 6B.

What is claimed is:

1. A switching system for effecting interconnection of circuits through a switching network comprising:

a multistage network which includes at least five matrix stages interconnected by links to provide plural paths between circuits connected to opposite ends of the network, and wherein each stage is divided into separate matrix groups, and wherein the matrix groups in each of the two end stages at each opposite end of the multistage network are connected to form a plurality of individual two stage networks, each two stage network providing paths for interconnecting any circuits connected to opposite ends of the two stage network;

means for selectively marking circuits connected to matrix groups in the stages at opposite ends of the multistage network;

switching means in the matrix groups in the plurality of two stage networks at both ends of the multistage network for providing signals designating the busy-free condition of individual link interconnections to the two stage networks;

detection means sequentially scanning the individual link interconnections to the two stage networks at one end of the multistage network and simultaneously therewith scanning the corresponding link interconnections to the two stage networks at the other end of the multistage network, so that the busy-free condition of the link interconnections that form separate paths through the network for interconnecting said marked circuits are sequentially scanned, and circuit means, responsive to the simultaneous detection of a free condition of link interconnections to each of said two stage networks at opposite ends of the multistage network defining a free path through the multistage network between marked circuits, for completing the connection through the multistage network including the free path.

2. A switching system as defined in claim 1 wherein said circuit means includes:

a plurality of groups of switch means, a separate group of switch means for each of the two stage networks at at least one end of the multistage network, and wherein separate ones of said switch means in said plurality of groups are connected in series with individual ones of said link interconnections to the two stage networks;

means for sequentially applying enabling signals synchronized to said detection means to said switch means at a rate wherein said switch means do not respond to said enabling signals;

means for selecting the group of switch means associated with the two stage network that includes paths for interconnecting marked circuits, and means for stopping said applying means when a free path is detected so that an enabling signal is applied to one of the switch means in the selected group in said free path for a sufficient period of time to complete a connection through the multistage network between marked circuits at opposite ends of said multistage network.

3. A switching system as defined in claim 1 wherein said circuit means includes:

a plurality of groups of switch means, a separate group of switch means for each of the two stage networks at at least one end of the multistage network, and wherein separate ones of said switch means in said plurality of groups are connected in series with individual ones of said link interconnections to the two stage networks;

means for sequentially applying a first signal synchronized to said detection means to a selected group of switch means;

means for stopping said first signal applying means when a free path is detected so that said first signal applying means applies a continuous signal to the switch means in said free path, and means for applying a second signal to the switch means in said free path when said first signal applying means is stopped so that said switch means in said free path is actuated by the simultaneous presence of said first and second signals to complete a connection between marked circuits on opposite ends of said multistage network.

4. A switching system as defined in claim 1 wherein:

the multistage network includes a first, second, third, fourth and fifth matrix stages and wherein the matrix groups in he first and second stages are interconnected as a plurality of individual two stage networks and the matrix groups in the fourth and fifth stages are interconnected as a plurality of individual two stage networks;

said switching means are included in matrix groups in said first, second, fourth and fifth stages, and said detection means is connected to the link interconnection connected to the switching means in said second and fourth stages.

5. A switching system as defined in claim 4 wherein:

said switching means are included in the third stage and are interconnected by links to the switching means in the first, second, fourth and fifth matrix stages to correspond with the paths through said first, second, third, fourth and fifth matrix stages.

6. A switching system as defined in claim 1 wherein:

the multistage network includes first, second, third, fourth, fifth and sixth stages and wherein the matrix groups in the first and second stages, the third and fourth stages and the fifth and sixth stages are interconnected to form three groups of a plurality of two stage networks.

7. A switching system as defined in claim 6 wherein:

said switch means are included in each of the first, second, third, fourth, fifth and sixth stages and are interconnected by links to correspond with paths through said first, second, third, fourth, fifth and sixth stages.

8. A switching system for effecting interconnection of circuits through a switching network comprising:

a multistage network including at least five matrix stages interconnected to provide plural control paths and corresponding plural switch paths between circuits connected to opposite ends of the network, wherein each stage is divided into a plurality of separate matrix groups, wherein each matrix group includes a plurality of cross-point switching devices arranged to form a matrix switch with the crosspoint devices connected in the control paths and the switches of the crosspoint devices connected in said switch paths, and wherein the matrix groups in each of the two end stages at opposite ends of the network are interconnected as a plurality of individual two stage networks providing paths for connecting any circuits connected to opposite ends of the two state network;

means for selectively marking the control path interconnections of the circuits connected to opposite ends of the multistage network;

first switching means in the matrix groups in the plurality of two stage networks at both ends of the multistage network interconnected to provide signals designating the busy-free condition of control path interconnections to the two stage networks;

a plurality of second switching means connected in series with the control path interconnections to one of said plurality of two stage networks;

means for selecting the two stage networks at opposite ends of the multistage network that include paths for interconnecting said marked circuits at opposite ends of said multistage network;

detecting means sequentially monitoring the signals provided by the first switching means in a selected one of the two stage networks and simultaneously therewith sequentially monitoring the signals provided by the first switching means in a selected other one of said two stage networks so that the busy-free condition of the pairs of the control path interconnections that define separate control paths through said multistage network between the marked circuits are sequentially detected, and
circuit means responsive to said detecting means for actuating one of said plurality of said second switching means in the free control path to complete a connection through the multistage network via the two free control path interconnections.

9. A switching system as defined in claim 8 including:
means for stopping said detecting means when the free control path interconnections are detected, and
means for restarting said detecting means after a preset period of time.

10. A switching system as defined in claim 8 wherein said circuit means includes:
scanning means for applying sequential scanning signals in synchronism with said detecting means to said plurality of second switching means for a time duration that is insufficient to permit enabling of said second switching means, and
circuit means for stopping said scanning means when a free control path is detected and wherein a scan signal of sufficient duration is applied to the second switch means in the free control path to switch the cross-point devices and complete the free path.

11. A switching system as defined in claim 8 including:
means for stopping said detecting means when signals indicating a free control path have been detected, and
means applying a switching signal to said one of said second switching means when said detecting means is stopped so that said second switching means in a control path interconnection of said free control path is actuated to complete the connection through the multistage network.

12. A switching system as defined in claim 8 wherein:
the network includes first, second, third, fourth and fifth stages;
said first switching means are included in matrix groups in first, second, fourth and fifth stages, and
said detecting means is connected to receive signals from said first switching means in said first and second stages and in said fourth and fifth stages.

13. A switching system as defined in claim 12 wherein:
said first switching means are included in the third matrix stage and are interconnected to the first switching means in the first, second, fourth and fifth matrix stages to correspond with the control paths through said first, second, third, fourth and fifth matrix stages.

14. A switching system as defined in claim 8 wherein:
the multistage network includes first, second, third, fourth, fifth and sixth stages and wherein the matrix groups in the first and second stages, the third and fourth states and the fifth and sixth stages are interconnected to form three groups of a plurality of two stage networks.

15. A switching system for effecting interconnection of telephone circuits through a switching network comprising:
a multistage network including at least five switching matrix stages wherein each stage is divided into separate matrix groups, wherein each matrix group includes a plurality of crosspoint devices arranged to form a matrix switch including control leads and switch leads, wherein the control leads and switch leads of crosspoint devices in the matrix groups in two end stages at each opposite end of the multistage network are interconnected to form a plurality of individual two stage networks, and wherein the control leads and switch leads of the two stage networks are connected by links to the control leads and switch leads, respectively, of the matrix groups of other adjacent stages to provide plural paths between telephone circuits connected to opposite ends of said multistage network;
means for selectively marking the control leads of telephone circuits connected to the two stage networks at opposite ends of said multistage network;
first switching means in the plurality of matrix groups in at least the two stages forming each two stage network for providing signals designating the busy-free condition of the link interconnections between the said two stage networks and the matrix groups of the stages adjacent said two stage networks;
circuit means for selecting the two stage networks including control path interconnections for completing paths between said marked telephone circuits;
a plurality of second switching means in series with the control lead link interconnections between one of said two stage networks and the matrix groups of an adjacent stage;
scanning means for sequentially enabling the plurality of second switching means connected in the control link interconnection to the selected two stage networks for a time duration insufficient to eanble the second switching means to switch the crosspoint devices, and
means for simultaneously detecting a signal from the selected two stage networks indicating a free condition of a control lead interconnection through the multistage network and for stopping said scanning means so that a second switching means in the detected free control lead interconnection is enabled for a sufficient time duration to switch crosspoint devices in said plurality of stages to complete the control path between marked telephone circuits on opposite ends of said multistage network.

16. A switching system as defined in claim 15 wherein:
the crosspoint devices comprise relay switches having mark and sleeve relay coils, wherein the mark coils are interconnected by said control leads, wherein said sleeve coils are interconnected by sleeve leads and by contacts of their respective relay switches to form plural hold current paths, and wherein other contacts of said relay switches are interconnected to form plural signal paths, and
said first switching means comprises a separate contact from each of said realy switches in each of said matrix groups in at least said matrix groups in said two stage networks, and wherein the contacts are interconnected in the matrix groups in each of the two stage networks to provide separate busy-free signals for each of the control lead interconnections to said two stage networks and so that when one of the relays connected to a control lead interconnection is activated, the contacts of the activated relay provide a busy signal for the control lead interconnection to the two stage network.

17. A switching system as defined in claim 15 wherein:

the network includes first, second, third, fourth and fifth stages and wherein the matrix groups in the first and second stages are interconnected as a plurality of individual two stage networks and the matrix groups in the fourth and fifth stages are interconnected as a plurality of individual two stage networks;

said first switching means are included in at least said first, second, fourth and fifth stages, and said detecting means is connected to receive signals from the first switching means in said first and second stages and in said fourth and fifth stages.

18. A switching system as defined in claim 17 wherein:

said first switching means are included in the third matrix stage and are interconnected to the first, second, fourth and fifth matrix stages to correspond with the paths through said first, second, third, fourth and fifth matrix stages.

19. A switching system for effecting interconnection of circuits through a switching network comprising:

a multistage network including at least five matrix stages interconnected to provide plural paths between circuits connected to opposite ends of said multistage network, wherein each stage is divided into separate matrix groups, and wherein the two stages at each opposite end of the multistage network are interconnected to form two groups of a plurality of individual two stage networks in a manner to provide paths for connecting any circuits connected to opposite ends of the two stage networks;

means for selectively marking circuits connected to matrix groups in the stages at opposite end of the network;

switching means in the plurality of matrix groups in stages interconnected to form the two stage networks providing signals designating the busy-free condition of individual link interconnections between the two stage networks and the matrix groups of an adjacent stage;

detection means sequentially scanning the signals provided by the switching means in the two stage network connected to a marked circuit at one end of the multistage network and simultaneously therewith sequentially scanning the signals provided by the switching means in the two stage network connected to a marked circuit at the other end of the multistage network, so that the busy-free condition of the link interconnections that define separate paths through the multistage network for interconnecting the marked circuits are sequentially detected, and circuit means responsive to the simultaneous detection of a free condition in a link interconnection to a two stage network at opposite ends of the multistage network to complete a path through said multistage network between marked circuits connected to opposite ends of said multistage network.

20. A switching system as defined in claim 19 wherein said circuit means includes:

switch means connected in series with individual ones of said link interconnections to one of said two groups of said two stage networks;

scanning means for sequentially applying enabling signals synchronized to said deection means to the switch means connected in series with the interconnections to a two stage network connected to a marked circuit at a rate wherein said switch means do not respond to said signal, and means for stopping scanning when a free path is detected for applying an enabling signal of sufficient duration to the switch means in said free path to complete a connection between marked circuits on opposite ends of said multistage network.

21. A switching system as defined in claim 20 wherein:

said network includes first, second, third, fourth, fifth and sixth stages;

said matrix groups in said first and second, said third and fourth and said fifth and sixth stages are interconnected to form three separate groups of a plurality of two stage networks, and said switching means are included in the matrix groups of said first, second, third, fourth, fifth and sixth stages.

22. A switching system as defined in claim 19 wherein said circuit means includes:

switch means connected in series with individual ones of said link interconnections to one of said two groups of two stage networks;

scanning means for sequentially applying first partial enabling signals synchronized to said detection means to said switch means;

means for stopping said scanning means when free link interconnections defining a free path are detected, and means for applying a second partial enable signal to the switch means connected in series with the interconnections to the two stage networks connected to marked circuits after said scanning means stopped so that said switch means is actuated by the simultaneous presence of said first and second signals to complete a path between marked circuits on opposite ends of said multistage network.

23. A switching system for effecting interconnection of circuits through a switching network comprising:

a multistage network including a plurality of matrix stages interconnected by links to provide plural paths between circuits connected to opposite ends of the network, and wherein each stage is divided into separate matrix groups, and wherein at least the two end stages on each opposite side of the multistage network are connected to form two groups of a plurality of two stage networks;

means for selectively marking circuits connected to matrix groups in the stages at opposite ends of the multistage network;

first switching means in the plurality of matrix groups in the two groups of two stage networks for providing signals designating the busy-free condition of individual link interconnections to the two stage networks;

a first group of link check circuits, one for each of said plurality of two stage networks in one group at one end of the multistage network, coupled to the link connections to individual ones of the two stage networks for monitoring the busy-free signals from said first switching means;

a second group of link check circuits, one for each of said plurality of two state networks, in the other group at the other end of the multistage network, coupled to the link interconnections to individual ones of the two stage networks fo monitoring the busy-free signals from said first switching means;

a plurality of groups of switching means, one group for each of the plurality of two stage networks of at least one group wherein separate switching means are connected in series with individual ones of the link connections to the two stage networks;

first circuit means, responsive to the marking of the circuits connected to said one end of the multistage network, for selectively enabling one of said first groups of link check circuits monitoring link connections forming a portion of paths through the network to the marked circuits, and for enabling corresponding ones of said groups of switching means;

second circuit means, responsive to the marking of the circuits connected to said other end of the multistage network, for selectively enabling ones of said second groups of link check circuits monitoring link connections forming a portion of paths through the network to the marked circuits;

counting circuit means for providing a series of sequential scanning pulses;

third circuit means coupled to apply the scanning pulses to said first and second groups of link check circuits so that the link check circuits enabled by said first and second circuit means simultaneously scan the busy-free condition of the link interconnections to their corresponding two stage networks;

fourth circuit means for stopping said counting circuit means in response to a simultaneous free condition signal from the first and second enabled link check circuits;

fifth circuit means for applying said scanning signal to the groups of switching means enabled by said first circuit means so that the switching means in the detected free path is enabled when said counting circuit means is stopped, and circuit means for restarting said counting circuit means.

24. A switching system as defined in claim 23 wherein:

said counting circuit means, when stopped, provides a continuous signal corresponding to the scanning pulse at which the counting means is stopped, and said fifth circuit means is responsive to a signal from the fourth circuit means to apply the continuous signal from said counting circuit means to said switching means enabled by said first circuit means to activate the switching means and complete the path through the network.

25. A switching system as defined in claim 23 wherein:

said counting circuit means provides said scanning signals at a sufficiently rapid repetition rate so that said switching means do not respond to the scanning signal from said counting circuit means until the counting circuit means is stopped.

26. A switching system for effecting interconnection of circuits through a switching network comprising:

a multistage network including a plurality of matrix stages interconnected to provide plural control paths and plural holding paths between circuits connected to opposite ends of the network, wherein each stage is divided into a plurality of separate matrix groups, wherein each matrix group includes a plurality of crosspoint relays arranged to form a matrix switch, wherein each relay includes a hold winding connection in series with contacts of the relay and includes a control winding, with the control windings of each relay being connected in the control paths, and the hold windings of each relay being connected through the series contacts in corresponding holding paths, and wherein two stages at each opposite end of the multistage network are interconnected to form two group of a plurality of individual two stage networks, each group being at opposite ends of the network;

means for selectively marking circuits connected to the matrix groups in the stages at opposite ends of the network;

detection means sequentially scanning the individual holding path connections to the two stage network connected to a marked circuit at one end of the multistage network and simultaneously therewith sequentially scanning the individual holding path connections to the two stage network connected to a marked circuit at the other end of the multistage network, so that the busy-free condition of the link interconnections that define separate paths through the multistage network for interconnecting the marked circuits are sequentially detected, and circuit means, responsive to the simultaneous detection of free holding path connections to each two stage networks at opposite ends of the multistage network defining a free path through the multistage network between marked circuits, for completing the interconnection through the multistage network including the free path.

27. A switching system as defined in claim 26 wherein said circuit means includes:

a plurality of switch means, a separate switch means for each of the two stage networks in at least one of said groups of two stage networks, and wherein separate ones of said switch means are connected in series with said control path link connections to said at least one of said groups of the two stage networks, and means for applying enabling signals synchronized to said detection means to selected switch means included in control paths for interconnecting the marked circuits at a rate insufficient to permit enabling of said switch means, and when a free path is detected to apply an enabling signal to said switch means in the control path of a detected free path for a sufficient period of time to complete a connection through the network between marked circuits at opposite ends of said network.

28. A switching system as defined in claim 26 wherein said circuit means includes:

a plurality of switch means, a separate switch means for each of the two stage network in at least one of said groups of two stage networks, and wherein separate ones of said switch means are connected in series with said control path connections to said at least one of said groups of the two stage networks;

means for sequentially applying a first signal synchronized to said detection means to selected switch means included in control paths for interconnecting the marked circuits, and when a free path is detected for applying a continuous signal to the switch means in the control path of said detected free path, and means for applying a second signal to the switch means in said free path when a free path is detected so that said switch means in said detected free path is actuated by the simultaneous presence of said first and second signals to complete a connection between marked circuits on opposite ends of said network.

* * * * *

UNITED STATES PATENT AND TRADEMARK OFFICE
CERTIFICATE OF CORRECTION

PATENT NO. : 3,748,390 Page 1 of 1

DATED : July 24, 1973

INVENTOR(S) : Klaus Guendenpfennig, et al

It is certified that error appears in the above-identified patent and that said Letters Patent are hereby corrected as shown below:

| | |
|---|---|
| Col. 1, line 11 | After "matrix" insert ---switching---. |
| Col. 3, line 36 | "tne" should read ---the---. |
| Col. 6, line 24 | "scannin" should read ---scanning---. |
| Col. 7, line 50 | "stolped" should read ---stopped---. |
| Col. 9, line 43 | "914" should read ---194---. |
| Col. 15, line 14 | "supply" should read ---apply---. |
| Col. 17, line 55 | "inlude" should read ---include---. |
| Col. 24, line 32 | "eanble" should read ---enable---. |
| Col. 25, line 66 | "deection" should read ---detection---. |
| Col. 27, line 1 | "fo" should read ---for---. |
| Col. 28, line 3 | "connection" should read ---connected---. |
| Col. 28, line 10 | "group" should read ---groups---. |

Signed and Sealed this

*tenth* Day of *February 1976*

[SEAL]

*Attest:*

RUTH C. MASON
*Attesting Officer*

C. MARSHALL DANN
*Commissioner of Patents and Trademarks*